US009213906B2

(12) United States Patent
Mise et al.

(10) Patent No.: US 9,213,906 B2
(45) Date of Patent: Dec. 15, 2015

(54) INFORMATION PROCESSING APPARATUS AND METHOD

(75) Inventors: Ryoko Mise, Kawasaki (JP); Shinji Shiraga, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 1000 days.

(21) Appl. No.: 12/572,090

(22) Filed: Oct. 1, 2009

(65) Prior Publication Data

US 2010/0122063 A1  May 13, 2010

(30) Foreign Application Priority Data

Oct. 3, 2008  (JP) .................................. 2008-258966

(51) Int. Cl.
  *G06F 9/30*  (2006.01)
  *G06K 9/00*  (2006.01)
(52) U.S. Cl.
  CPC .................................. *G06K 9/00973* (2013.01)
(58) Field of Classification Search
  CPC .................................................. G06K 9/00973
  See application file for complete search history.

(56) References Cited

U.S. PATENT DOCUMENTS

2003/0163512 A1  8/2003  Mikamo
2004/0032512 A1*  2/2004  Silverbrook ............... 348/222.1

FOREIGN PATENT DOCUMENTS

JP  2003-256221 A  9/2003

OTHER PUBLICATIONS

Albonesi et al., "Dynamically Tuning Processor Resources with Adaptive Processing", Dec. 2003, IEEE.*
Bannister et al., "Task Allocation in Fault-Tolerant Distributed Systems", 1983, Acta Informatica 20, pp. 261-281.*
Paul Viola et al., Robust Real-time Object Detection, Proceedings of IEEE workshop on Statistical and Computational Theories of Vision, Vancouver, CA, Jul. 13, 2001, pp. 1-25.

* cited by examiner

*Primary Examiner* — John Lindlof
(74) *Attorney, Agent, or Firm* — Canon USA, Inc., IP Division

(57) ABSTRACT

A read-only memory (ROM) includes storage areas used as a processing setting data storage unit, a successful detection rate storage unit, and a processing time storage unit. A central processing unit (CPU) can function as a calculation unit by executing a calculation program stored on the ROM. The successful detection rate storage unit stores a predetermined successful detection rate (the probability of executing subsequent processing based on a result of a current processing). The processing time storage unit stores a predetermined processing time of each processing. The calculation unit calculates a module configuration for executing each processing according to the successful detection rate stored on the successful detection rate storage unit and the processing time stored on the processing time storage unit. The processing setting data storage unit stores setting data of a characteristic amount and a setting data of positional information about image data (the address of the image data).

13 Claims, 18 Drawing Sheets

|  | PROCESSING TIME Tm | SUCCESSFUL DETECTION RATE p | CUMULATIVE SUCCESSFUL DETECTION RATE P |  |  | NUMBER OF MODULES |
|---|---|---|---|---|---|---|
| STAGE 0 | 1 | 1/2 | 1 |  | STAGE 0 | 4 |
| STAGE 1 | 1 | 1/2 | 1/2 |  | STAGE 1 | 2 |
| STAGE 2 | 1 | 1/2 | 1/4 |  | STAGE 2 | 1 |

$$\frac{\text{PROCESSING TIME} \times \text{CUMULATIVE SUCCESSFUL DETECTION RATE}}{\text{NUMBER OF MODULES}} = \frac{1 \times 1}{\text{Num}[0]} = \frac{1 \times 1/2}{\text{Num}[1]} = \frac{1 \times 1/4}{\text{Num}[2]} \Rightarrow \therefore \text{Num}[0]:\text{Num}[1]:\text{Num}[2]=4:2:1$$

EX. 2

|  | PROCESSING TIME Tm | SUCCESSFUL DETECTION RATE p | CUMULATIVE SUCCESSFUL DETECTION RATE P |  |  | NUMBER OF MODULES |
|---|---|---|---|---|---|---|
| STAGE 0 | 1 | 3/4 | 1 |  | STAGE 0 | 4 |
| STAGE 1 | 1 | 1/3 | 3/4 |  | STAGE 1 | 3 |
| STAGE 2 | 1 | 1/4 | 1/4 |  | STAGE 2 | 1 |

$$\frac{\text{PROCESSING TIME} \times \text{CUMULATIVE SUCCESSFUL DETECTION RATE}}{\text{NUMBER OF MODULES}} = \frac{1 \times 1}{\text{Num}[0]} = \frac{1 \times 3/4}{\text{Num}[1]} = \frac{1 \times 1/4}{\text{Num}[2]} \Rightarrow \therefore \text{Num}[0]:\text{Num}[1]:\text{Num}[2]=4:3:1$$

EX. 3

|  | PROCESSING TIME Tm | SUCCESSFUL DETECTION RATE p | CUMULATIVE SUCCESSFUL DETECTION RATE P |  |  | NUMBER OF MODULES |
|---|---|---|---|---|---|---|
| STAGE 0 | 1 | 1/4 | 1 |  | STAGE 0 | 2 |
| STAGE 1 | 2 | 1/2 | 1/4 |  | STAGE 1 | 1 |
| STAGE 2 | 4 | 3/4 | 1/8 |  | STAGE 2 | 1 |

$$\frac{\text{PROCESSING TIME} \times \text{CUMULATIVE SUCCESSFUL DETECTION RATE}}{\text{NUMBER OF MODULES}} = \frac{1 \times 1}{\text{Num}[0]} = \frac{2 \times 1/4}{\text{Num}[1]} = \frac{4 \times 1/8}{\text{Num}[2]} \Rightarrow \therefore \text{Num}[0]:\text{Num}[1]:\text{Num}[2]=2:1:1$$

EX. 4

|  | PROCESSING TIME Tm | SUCCESSFUL DETECTION RATE p | CUMULATIVE SUCCESSFUL DETECTION RATE P |  |  | NUMBER OF MODULES |
|---|---|---|---|---|---|---|
| STAGE 0 | 1 | 1/6 | 1 |  | STAGE 0 | 3 |
| STAGE 1 | 2 | 1/2 | 1/6 |  | STAGE 1 | 1 |
| STAGE 2 | 4 | 1/16 | 1/12 |  | STAGE 2 | 1 |

$$\frac{\text{PROCESSING TIME} \times \text{CUMULATIVE SUCCESSFUL DETECTION RATE}}{\text{NUMBER OF MODULES}} = \frac{1 \times 1}{\text{Num}[0]} = \frac{2 \times 1/6}{\text{Num}[1]} = \frac{4 \times 1/12}{\text{Num}[2]} \Rightarrow \therefore \text{Num}[0]:\text{Num}[1]:\text{Num}[2]=3:1:1$$

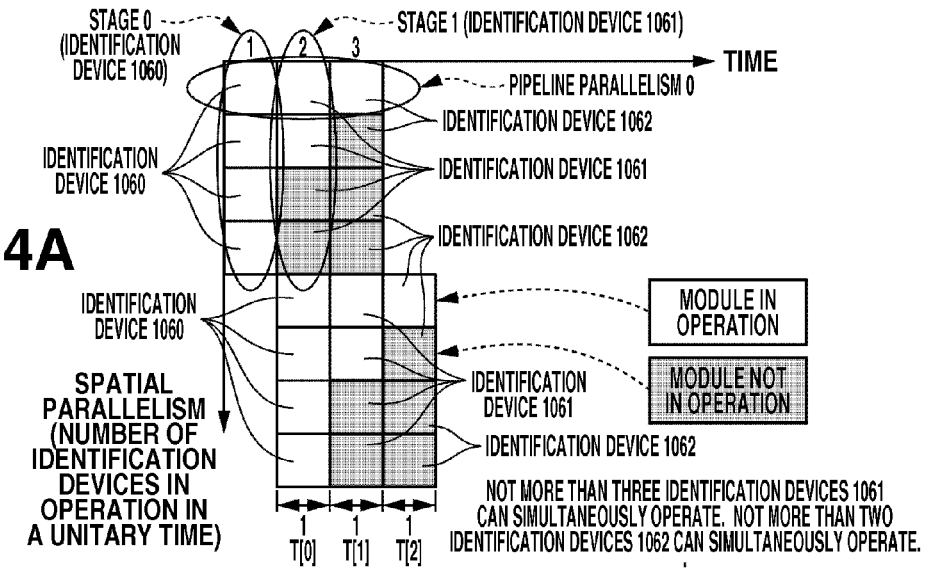
FIG.4A
FIG.4B
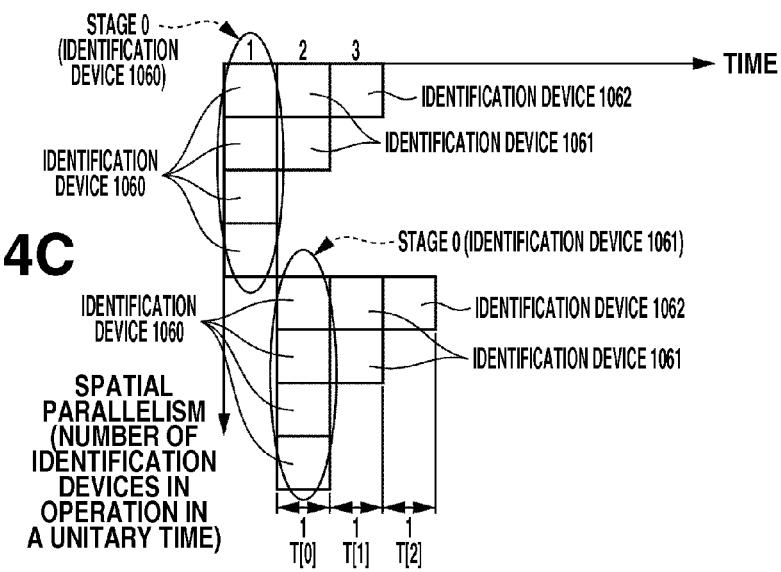
FIG.4C

FIG.5A
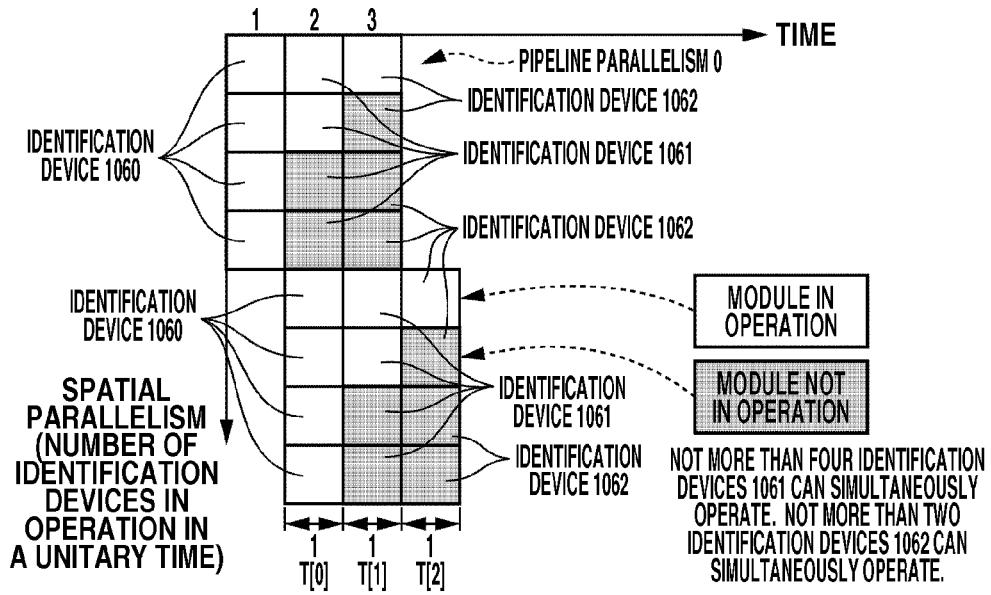
FIG.5B
WHEN PARALLEL PROCESSING IS EXECUTED BY CONSIDERING PROCESSING TIME AND SUCCESSFUL DETECTION RATE
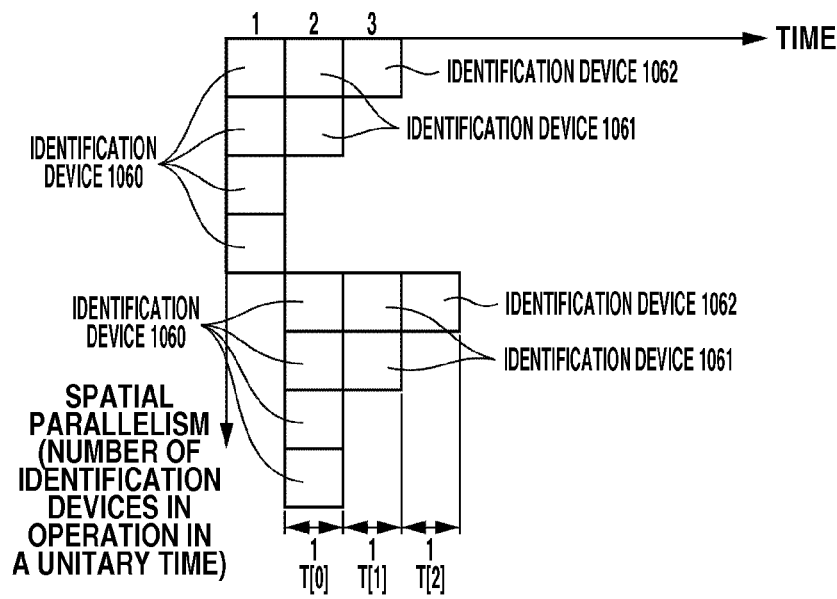

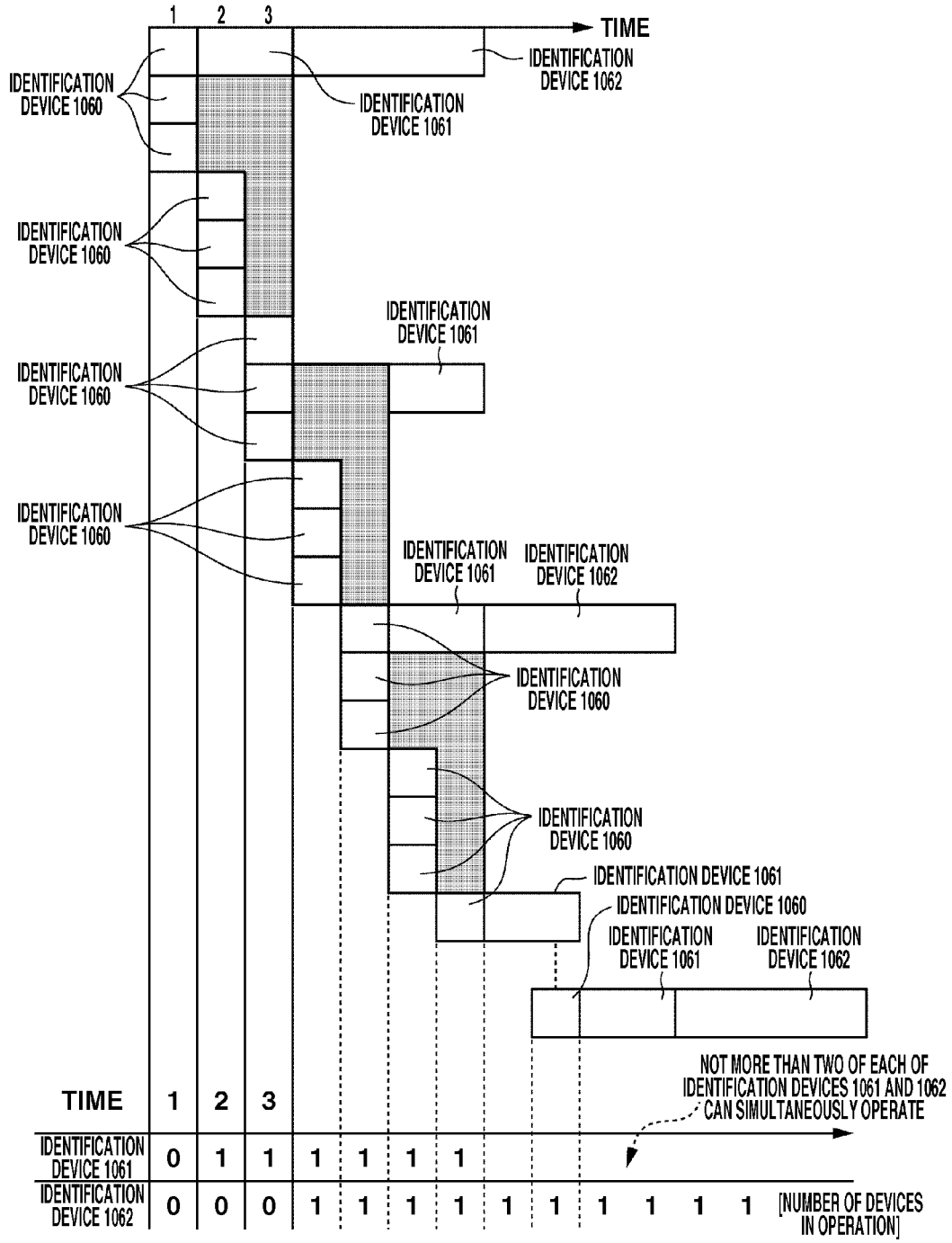

| | PROCESSING TIME Tm | SUCCESSFUL DETECTION RATE p | CUMULATIVE SUCCESSFUL DETECTION RATE P |
|---|---|---|---|
| STAGE 0 | 1 | 1/2 | 1 |
| STAGE 1 | 1 | 1/2 | 1/2 |
| STAGE 2 | 1 | 1/2 | 1/4 |

⇒

| | NUMBER OF MODULES |
|---|---|
| STAGE 0 | 4 |
| STAGE 1 | 2 |
| STAGE 2 | 1 |

$$T[N] = \frac{Td[N]}{Num[N]} = \frac{Tm[N] \times P[N]}{Num[N]} = \frac{1 \times 1}{Num[0]} = \frac{1 \times 1/2}{Num[1]} = \frac{1 \times 1/4}{Num[2]} \implies \therefore Num[0]:Num[1]:Num[2]=4:2:1$$

EXEMPLARY PLAN 1) Num[0]:Num[1]:Num[2]=4:1:1

$$T[0] = \frac{1 \times 1}{4} = \frac{1}{4}$$
$$T[1] = \frac{1 \times 1/2}{1} = \frac{1}{2}$$
$$T[2] = \frac{1 \times 1/4}{1} = \frac{1}{4}$$

EXEMPLARY PLAN 2) Num[0]:Num[1]:Num[2]=3:2:1

$$T[0] = \frac{1 \times 1}{3} = \frac{1}{3}$$
$$T[1] = \frac{1 \times 1/2}{2} = \frac{1}{4}$$
$$T[2] = \frac{1 \times 1/4}{1} = \frac{1}{4}$$

EXEMPLARY PLAN 4) Num[0]:Num[1]:Num[2]=3:1:2

$$T[0] = \frac{1 \times 1}{3} = \frac{1}{3}$$
$$T[1] = \frac{1 \times 1/2}{1} = \frac{1}{2}$$
$$T[2] = \frac{1 \times 1/4}{2} = \frac{1}{2}$$

EXEMPLARY PLAN 4) Num[0]:Num[1]:Num[2]=2:3:1

$$T[0] = \frac{1 \times 1}{2} = \frac{1}{2}$$
$$T[1] = \frac{1 \times 1/2}{3} = \frac{1}{6}$$
$$T[2] = \frac{1 \times 1/4}{1} = \frac{1}{4}$$

EXEMPLARY PLAN 5) Num[0]:Num[1]:Num[2]=2:2:2

$$T[0] = \frac{1 \times 1}{2} = \frac{1}{2}$$
$$T[1] = \frac{1 \times 1/2}{2} = \frac{1}{4}$$
$$T[2] = \frac{1 \times 1/4}{2} = \frac{1}{8}$$

| | ALTERNATIVE OF NUMBER OF MODULES TO BE CALCULATED | 1 | 2 | 3 | 4 | 5 | 6 | 7 | 8 | 9 | 10 |
|---|---|---|---|---|---|---|---|---|---|---|---|
| STAGE 0 | 4 | 4 | 3 | 3 | 2 | 2 | 2 | 1 | 1 | 1 | 1 |
| STAGE 1 | 2 | 1 | 2 | 1 | 3 | 2 | 1 | 4 | 3 | 2 | 1 |
| STAGE 2 | 1 | 1 | 1 | 2 | 1 | 2 | 3 | 1 | 2 | 3 | 4 |
| STAGE PROCESSING TIME MAXIMUM VALUE | 1/4 | 1/2 | 1/3 | 1/2 | 1/2 | 1/2 | 1/2 | 1 | 1 | 1 | 1 |

FIG.9

| EX. 1 | PROCESSING TIME Tm | SUCCESSFUL DETECTION RATE p | CUMULATIVE SUCCESSFUL DETECTION RATE P |
|---|---|---|---|
| STAGE 0 | 1 | 1/4 | 1 |
| STAGE 1 | 2 | 1/2 | 1/4 |
| STAGE 2 | 4 | 3/4 | 1/8 |

⇒

| | NUMBER OF MODULES |
|---|---|
| STAGE 0 | 2 |
| STAGE 1 | 1 |
| STAGE 2 | 1 |

$$T[N] = \frac{Td[N]}{Num[N]} = \frac{Tm[N] \times P[N]}{Num[N]} = \frac{1 \times 1}{Num[0]} = \frac{2 \times 1/4}{Num[1]} = \frac{4 \times 1/8}{Num[2]} \Rightarrow \therefore Num[0]:Num[1]:Num[2]=2:1:1$$

EXEMPLARY PLAN 1) Num[0]:Num[1]:Num[2]=4:1:1

$$T[0] = \frac{1 \times 1}{4} = \frac{1}{4}$$
$$T[1] = \frac{2 \times 1/4}{1} = \frac{1}{2}$$
$$T[2] = \frac{4 \times 1/8}{1} = \frac{1}{2}$$

EXEMPLARY PLAN 2) Num[0]:Num[1]:Num[2]=2:3:1

$$T[0] = \frac{1 \times 1}{2} = \frac{1}{2}$$
$$T[1] = \frac{2 \times 1/4}{3} = \frac{1}{6}$$
$$T[2] = \frac{4 \times 1/8}{1} = \frac{1}{4}$$

EXEMPLARY PLAN 4) Num[0]:Num[1]:Num[2]=3:2:1

$$T[0] = \frac{1 \times 1}{3} = \frac{1}{3}$$
$$T[1] = \frac{2 \times 1/4}{2} = \frac{1}{4}$$
$$T[2] = \frac{4 \times 1/8}{1} = \frac{1}{2}$$

EXEMPLARY PLAN 4) Num[0]:Num[1]:Num[2]=2:2:2

$$T[0] = \frac{1 \times 1}{2} = \frac{1}{2}$$
$$T[1] = \frac{2 \times 1/4}{2} = \frac{1}{4}$$
$$T[2] = \frac{4 \times 1/8}{2} = \frac{1}{4}$$

EXEMPLARY PLAN 5) Num[0]:Num[1]:Num[2]=3:1:2

$$T[0] = \frac{1 \times 1}{3} = \frac{1}{3}$$
$$T[1] = \frac{2 \times 1/4}{1} = \frac{1}{2}$$
$$T[2] = \frac{4 \times 1/8}{2} = \frac{1}{4}$$

EXEMPLARY PLAN 6) Num[0]:Num[1]:Num[2]=2:1:3

$$T[0] = \frac{1 \times 1}{2} = \frac{1}{2}$$
$$T[1] = \frac{2 \times 1/4}{1} = \frac{1}{2}$$
$$T[2] = \frac{4 \times 1/8}{3} = \frac{1}{6}$$

| | ALTERNATIVE OF NUMBER OF MODULES TO BE CALCULATED | 1 | 2 | 3 | 4 | 5 | 6 | 7 | 8 | 9 | 10 |
|---|---|---|---|---|---|---|---|---|---|---|---|
| STAGE 0 | 2 | 4 | 3 | 3 | 2 | 2 | 2 | 1 | 1 | 1 | 1 |
| STAGE 1 | 2 | 1 | 2 | 1 | 3 | 2 | 1 | 4 | 3 | 2 | 1 |
| STAGE 2 | 1 | 1 | 1 | 2 | 1 | 2 | 3 | 1 | 2 | 3 | 4 |
| STAGE PROCESSING TIME MAXIMUM VALUE | 1/2 | 1/2 | 1/2 | 1/2 | 1/2 | 1/2 | 1/2 | 1 | 1 | 1 | 1 |
| STAGE PROCESSING TIME SECOND LARGEST VALUE | 1/2 | 1/2 | 1/3 | 1/3 | 1/2 | 1/4 | 1/2 | 1 | 1 | 1 | 1 |
| STAGE PROCESSING TIME THIRD LARGEST VALUE | 1/2 | 1/4 | 1/4 | 1/4 | 1/6 | 1/4 | 1/6 | 1 | 1 | 1 | 1 |

CHANGE IDENTIFICATION TARGET ⇩

EX. 2) WHEN T[0]=T[1]=T[2]=1, p[0]=3/4, p[1]=1/3, p[2]=1/4,
Num[0]:Num[1]:Num[2]=4:3:1

⇩ CHANGE IDENTIFICATION TARGET

EX. 3) WHEN T[0]=1, T[1]=2, T[2]=4, p[0]=1/4, p[1]=1/2, p[2]=3/4,
Num[0]:Num[1]:Num[2]=2:1:1

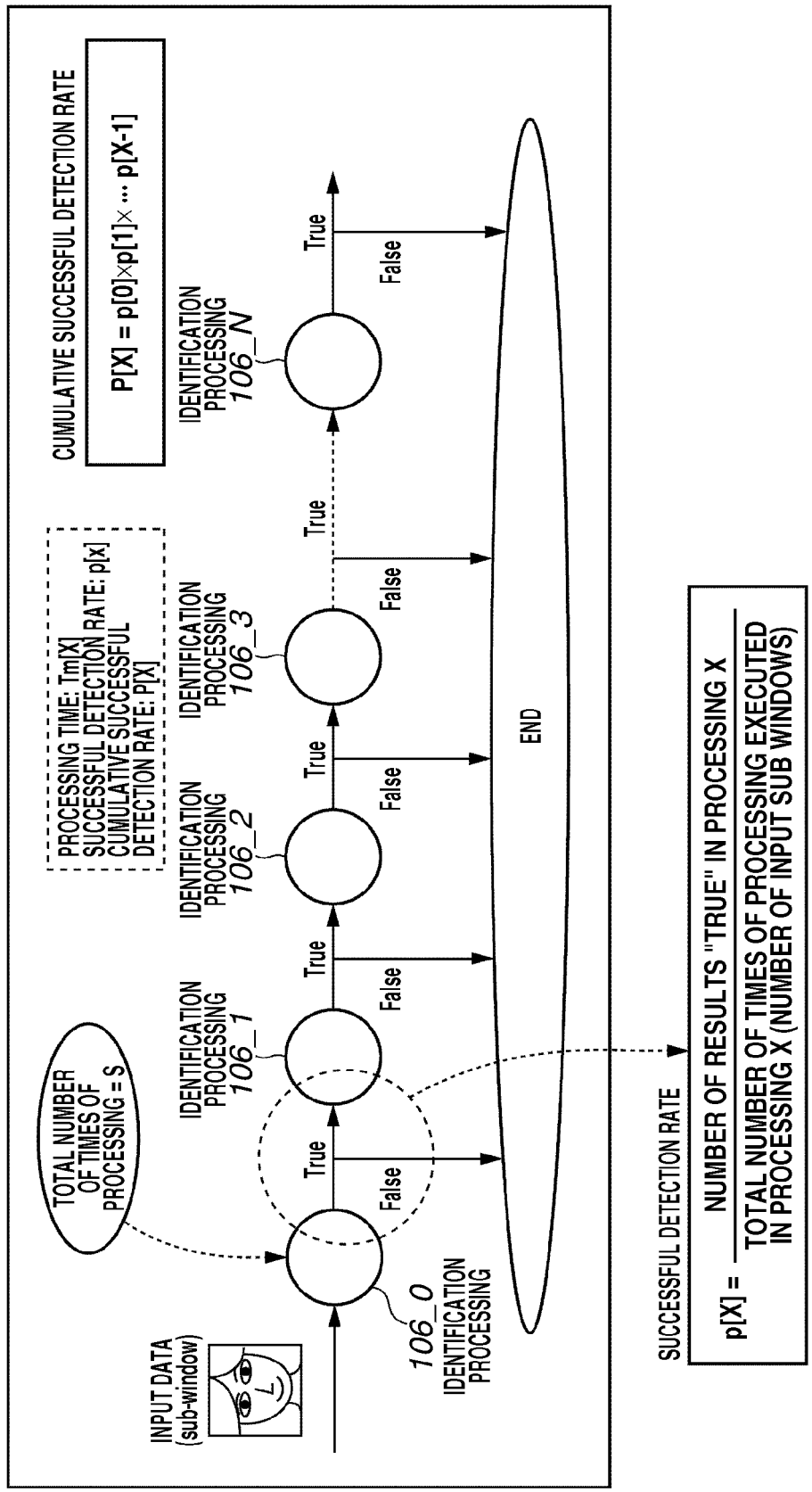

FIG.13D
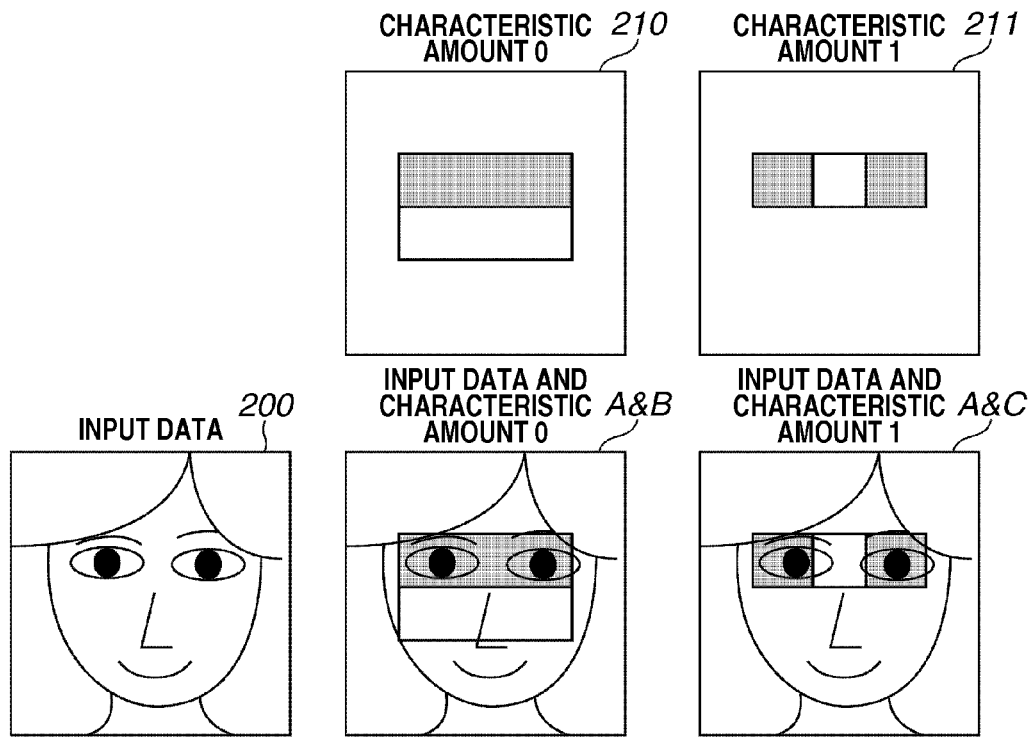
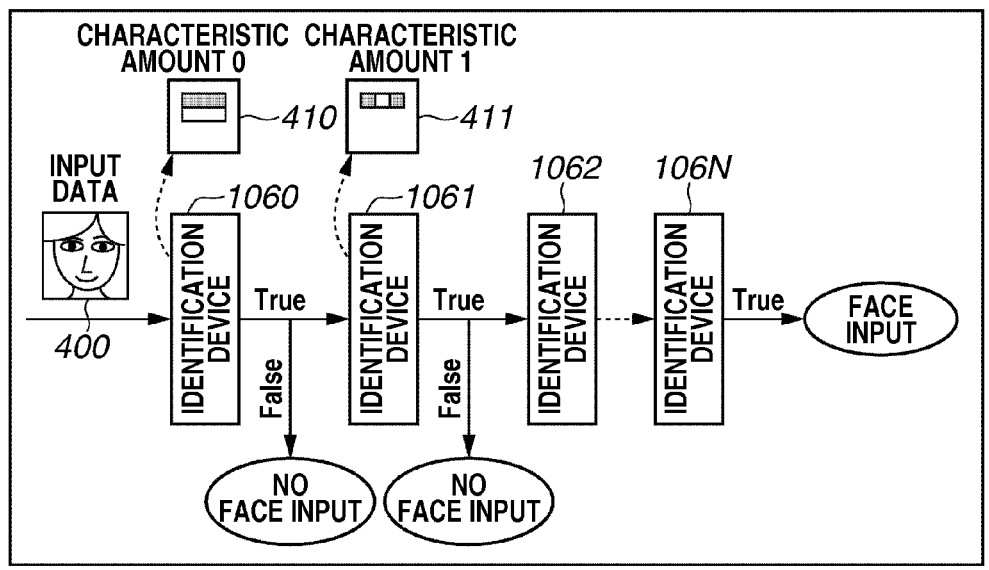

FIG.15
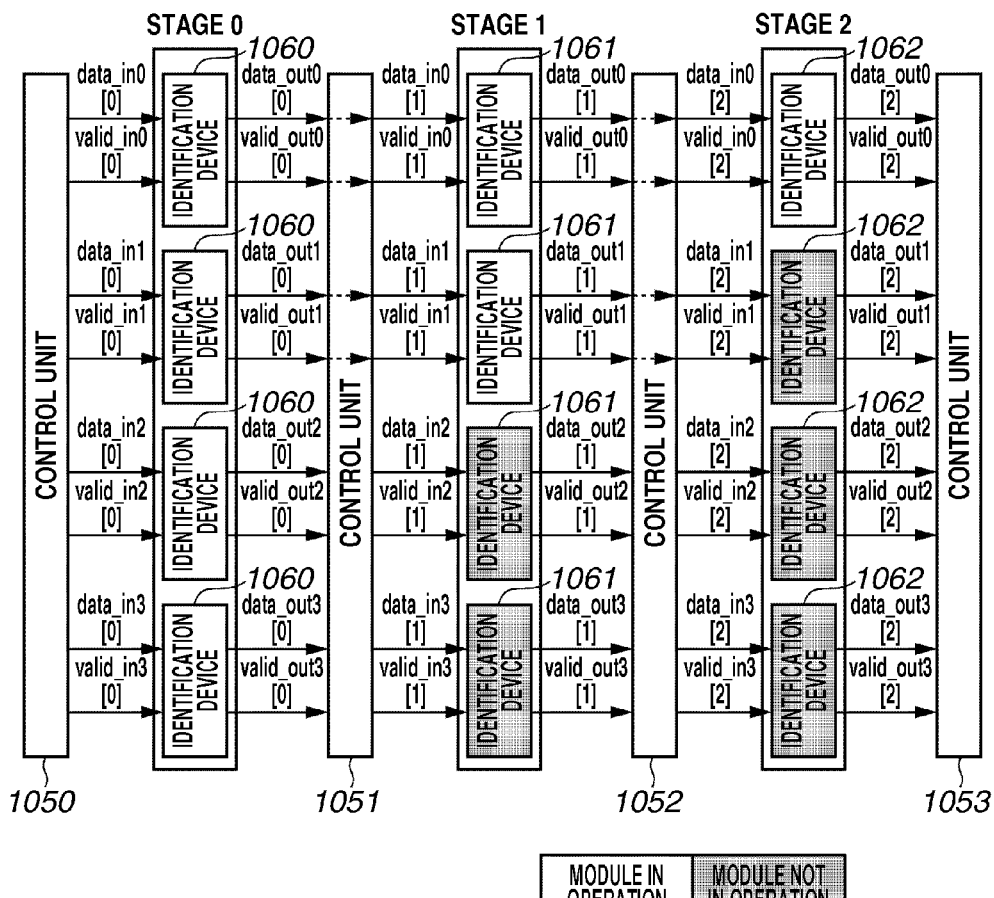

INFORMATION PROCESSING APPARATUS AND METHOD

BACKGROUND OF THE INVENTION

1. Field of the Invention

The present invention relates to an information processing apparatus and an information processing method configured to execute a plurality of stages of information processing.

2. Description of the Related Art

A conventional method, in a digital camera and a printer, detects a specific object such as a person and a person's face included in an input image and executes processing appropriate to the detected object. As an example of processing for detecting a specific object, a conventional method executes face detection processing to execute skin color correction processing on image data of a person's face.

Various methods have been discussed as a method for executing face detection processing. P. Viola and M. Jones, "Robust Real-time Object Detection", Second International Workshop on Statistical and Computational Theories of Vision, Jul. 13, 2001 discusses a method for executing face detection processing. Hereinbelow, the method discussed in the above literature will be simply referred to as the "Viola & Jones method". In addition, another conventional method for detecting a face of a person by utilizing symmetric characteristics of a person's face, template matching, or a neutral network has been discussed.

Now, an outline of the "Viola & Jones" method will be described below. FIGS. 13A through 13D schematically illustrate the Viola & Jones method. In the Viola & Jones method, a plurality of stages of identification processing are executed according to a result of learning by the Adaboost algorithm. As illustrated in a processing flow of FIG. 13A, the plurality of identification processing includes cascade processing. More specifically, in the cascade processing illustrated in FIG. 13A, if it is determined that subsequent identification processing is to be executed as a result of identification by specific identification processing, the Viola & Jones method outputs "True". On the other hand, if it is determined that subsequent identification processing is not to be executed as a result of identification by specific identification processing, the Viola & Jones method outputs "False". If the result "False" is output, the identification processing ends.

FIG. 13D illustrates an example of a result of learning. Referring to FIG. 13D, a characteristic amount 0 (210) is a characteristic amount in which as a result of a comparison between a small rectangle drawn over image data of eyes of a person (a part of an image) and a small rectangle drawn over a portion below the eyes of the person (i.e., the rectangle drawn over the cheek and nose of the person), the small rectangle drawn over the eyes portion is displayed in a darker state than the state of display of the small rectangle drawn over the portion below the eyes of the person. Furthermore, a characteristic amount 1 (211) is a characteristic amount in which in the rectangle drawn over the eyes portion, the portion of the rectangle over each eye is displayed in a dark state and a portion of the rectangle drawn over the middle of the forehead (the portion of the person's face between the eyes) is displayed in a lighter state than the portion of the rectangle drawn over the eyes.

If the above-described result of learning (learned characteristic amount) is compared with input data 400 and if a result of the identification processing executed for all characteristic amounts is "True", then the image is determined to be an image of a person's face.

In addition, in the "Viola & Jones" method, the identification processing is divided by into specific segment processing (hereinafter simply referred to as a "stage") as illustrated in a flow of FIG. 13B. More specifically, the Viola & Jones method executes True/False identification in each stage to identify whether an image is an image of a person's face. Furthermore, in an early stage of identification processing, the Viola & Jones method utilizes a simple characteristic only to minimize the rate of "false negative" (i.e., to determine an image of a person's face as a non-face image (overlooking)) and increase the rate of "false positive" (i.e., to determine a non-face image as an image of a person's face (detection error)) to a relatively high rate.

If a simple characteristic only is used, identification processing can be executed by performing a small number of operations. Accordingly, if identification processing is executed by using a processor, the identification processing can be executed at a high processing speed. Furthermore, in this case, it is possible to effectively execute identification processing on as many rectangular areas as possible to determine the same as "False" (non-face image) at an earlier stage of the identification processing. Accordingly, it is possible to completely execute face detection processing on the entire image within a short period of time.

Hereinbelow, the rate of appearance of an identification result "True" in a stage including cascade processing will be simply referred to as a "successful detection rate". Now, the "successful detection rate" will be described in detail below with reference to FIG. 13A.

Referring to FIG. 13A, "S" denotes a total number of identification processing in identification processing 106_0, which is first processing in the identification processing illustrated in FIG. 13A (i.e., "S"=total number of input rectangular areas). In identification processing 106_1, rectangular areas identified "True" in the identification processing 106_0 only are input. Accordingly, the number of rectangular areas to be processed in the identification processing 106_1 is calculated by multiplying the number of rectangular areas processed in the identification processing 106_0 by a successful detection rate p[0] in the identification processing 106_0 (i.e., "S×p[0]").

In addition, the number of rectangular areas to be processed in identification processing 106_2 is calculated by multiplying the number of rectangular areas to be processed in the identification processing 106_1 by a successful detection rate p[1] in the identification processing 106_1 (i.e., "S×p[0]×p[1]"). Therefore, by similar calculation, the number of rectangular areas to be processed in identification processing 106_N can be calculated by the following expression:

$$(S \times p[0] \times p[1] \times \ldots \times p[N-2]) \times p[N-1].$$

In the following description, the terms in the above-described expression "p[0]×p[1]× . . . ×p[N-1]" will be simply referred to as a "cumulative successful detection rate P[N] in identification processing at a stage N". In the identification processing 106_0, all data to be input is input. Therefore, P[0]=1 (i.e., data input in the identification processing 106_0 at the successful detection rate of 100%).

Now, a method for increasing processing speed in data processing will be described below. A general processing speed increasing method includes a method for increasing an operational frequency and a method for providing a first-in first-out (FIFO) memory and/or a random access memory (RAM) inside an information processing apparatus to prevent a rate-limited (a bottle neck in) transfer of data to be input and output. In addition, a method for chronologically and spatially parallelizing processing has been widely used. Now, a method for chronologically and spatially parallelizing processing will be described below.

To begin with, chronologically paralleled processing (pipeline processing) will be described. In pipeline processing, processing stages are arranged in a cascaded chronological order. Furthermore, a dedicated identification device is provided to each such stage. Accordingly, in pipeline processing, the identification devices, each of which being provided for each processing stage, can operate in parallel at the same time. Therefore, by executing pipeline processing, the processing can be executed at a high speed. However, processing time that is the longest of the processing time of all stages may become the bottle neck against the entire processing time. Accordingly, if the successful detection rate at all stages is 100% and the processing time for each stage is even, then the processing can be executed at a high processing speed as high by the number of times equivalent to the number of the stages included in the processing. More specifically, if four stages are included in the processing, the processing speed of the processing can be increased to a four-fold processing speed.

Now, spatially paralleled processing will be described below. In order to further increase the processing speed of the above-described pipeline processing, a conventional method includes a plurality of pipelined processing. Accordingly, a plurality of pieces of input data can be simultaneously processed. In the spatially paralleled processing described above, if data to be input can be constantly input in each pipeline processing, then the processing can be executed at a processing speed as high by the number equivalent to the number of spatially paralleled processing. More specifically, if four pipelines are provided, then the processing can be executed at a four-fold processing speed.

Now, an example of a conventional method for executing processing illustrated in a processing flow of FIG. 13B by hardware will be described in detail below with reference to FIG. 13C. In the example illustrated in FIG. 13C, each stage is implemented as an identification device (hardware). The identification devices are connected with one another via data lines and control lines ("valid" lines) to implement the above-described pipeline processing. An identification device 1060 is hardware for the stage 0 illustrated in FIG. 13B.

In the following description, "data_in0 [0]", of input data 0 ("data_in0") (i.e., a part of specific data to be input), is input to the identification device 1060. Furthermore, "data_in0[1]", of input data 0 ("data_in0"), is input to an identification device 1061. In addition, a "valid" signal refers to a control signal for controlling whether data_in (data to be input) and data_out (data to be output) is valid. If a result of processing by the identification device 1060 is determined "True", then the identification device 1060 outputs a signal "valid_out0[0]=1". On the other hand, if a result of processing by the identification device 1060 is determined "False", then the identification device 1060 outputs a signal "valid_out0 [0]=0".

If an asserted control signal ("valid_in0=1") is detected, then a control device 1050 detects that valid data ("data_in0") has been input. Then, the control device 1050 outputs the input data_in0 as data_in0 [0] to the identification device 1060. In addition, the control device 1050 outputs a parameter value "1" to the identification device 1060, which value indicating that valid data has been input, together with a signal "valid_in0[0]".

Then, the identification device 1060 detects a signal "valid_in0[0]=1". Furthermore, the identification device 1060 executes identification processing based on an input image ("data_in0 [0]"). Then, the identification device 1060 outputs a result of the identification processing as a signal "valid_out0[0]". If a result of the identification processing is "True", then the identification device 1060 outputs the input data 0 to the subsequent identification device 1061 as data_out0[0]. In addition, the identification device 1060 outputs a signal "valid_out0 [0]=1", which indicates that valid data has been input. Accordingly, the identification device 1061 can detect valid input data and execute processing based on the valid input data.

As described above, the above-described conventional method executes transmission of the input data via the data line and executes control for determining whether valid data has been input (whether to process the input data) based on the signal on the valid line. If all results of identification processing by the identification devices 1060 through 1062 are "True", then a control device 1053 outputs a control signal "valid_out0=1". In this case, it is determined that an image of a person' face is included in the input image data ("data_in0").

In the identification processing, if the same identification devices are used, a plurality of pieces of identification target data can be processed by changing the characteristic amount learned for each identification target data according to the identification target data (e.g., face, human figure, car). By changing the characteristic amount, a plurality of pieces of identification target data can be processed without changing the circuit configuration.

In addition, an example of an information processing apparatus configured to change identification target data will be described in detail below with reference to a block diagram of FIG. 14.

Referring to FIG. 14, the information processing apparatus includes a central processing unit (CPU) 100, a read-only memory (ROM) 101, a dynamic random access memory (DRAM) control device 102, a DRAM 103, a control unit 105, and a processing unit 106. The ROM 101 includes a processing setting data storage unit 104. The control unit 105, which includes control units 1050 through 1053, controls input data and a control signal. In addition, the processing unit 106, which includes identification devices 1060 through 1062, executes identification of a "valid" signal.

Now, a method for performing setting of processing, which is executed in starting processing, will be described below. At the start of identification processing, the CPU 100 acquires setting data of a characteristic amount, from the processing setting data storage unit 104 of the ROM 101. In addition, the CPU 100 sets the acquired setting data on an identification device provided within the processing unit 106. Furthermore, the CPU 100 acquires setting data of positional information of image data (i.e., an address of the image data) from the processing setting data storage unit 104. Moreover, the CPU 100 sets the acquired setting data on the control unit 105.

After completing the setting of the control unit 105 and the processing unit 106, the CPU 100 notifies the control unit 105 and the processing unit 106 that the processing has been started. Then, the control unit 105 accesses the DRAM controller 102 based on the image data positional information (the address) set thereon. Accordingly, the control unit 105 serially reads data of rectangular areas from the image data specific object the DRAM 103. In addition, the control unit 105 transfers the read rectangular area image data to the processing unit 106. After receiving the rectangular area image data from the control unit 105, the processing unit 106 serially executes identification processing on the received rectangular area image data.

If identification target data is to be changed, the control unit 105 notifies the CPU 100 that identification target data is to be changed. After receiving the notification from the control unit 105, the CPU 100, similarly to the operation described above, acquires setting data of a characteristic amount corresponding to new identification target data from the processing setting data storage unit 104. In addition, the CPU 100 sets the acquired setting data on an identification device provided within the processing unit 106. Furthermore, the CPU 100 acquires setting data of positional information of image data corresponding to the new identification target data from the processing setting data storage unit 104. In addition, the CPU 100 sets the acquired setting data on the control unit 105. In the above-described manner, the identification target data can be changed.

However, in the cascade processing by the "Viola & Jones method", as the processing advances to later stages, the amount of data to be processed may decrease compared with the amount of data to be processed in early stages. Accordingly, even if the processing is chronologically paralleled (i.e., if the pipeline processing is executed), the processing cannot be efficiently executed.

Japanese Patent Application Laid-Open No. 2003-256221 discusses a conventional method for improving the operation rate of a processor in parallel processing. In the method discussed in Japanese Patent Application Laid-Open No. 2003-256221, a process generated by using a parallelizing program is assigned to each time period of processing by each of a plurality of processors according to a predetermined length of time, which is determined for each parallelizing program according to a processor assignment rate.

In addition, in the method discussed in Japanese Patent Application Laid-Open No. 2003-256221, it is determined whether a plurality of parallelized processes, which are generated by using a specific parallelizing program, can be assigned so that the plurality of paralleled processes can be paralleledly executed in an idle time, of the time periods of processing by the processors, to which no process has been assigned. Furthermore, if it is determined that the plurality of processes can be paralleledly executed, then another paralleled process is additionally assigned to an idle time. Moreover, each processor executes the paralleled process assigned to the time period of processing executed by each processor.

In the method discussed in Japanese Patent Application Laid-Open No. 2003-256221, a process for which a turn-around time needs to be secured is assigned to a predetermined time slot. Furthermore, a plurality of paralleled processes, which can be executed in parallel, is additionally assigned to an available time slot. In the above-described manner, the above-described conventional method improves the operation rate of the processor while securing a turn-around time.

However, the above-described conventional method considers execution of a process of a predetermined processing load only. More specifically, the above-described conventional method cannot sufficiently improve the processor operation rate if the processing (process) load (processing execution time) varies according to input data as in the face detection in the "Viola & Jones" method.

In addition, in executing identification processing, in changing the identification target (e.g., a person's face, a person's figure, or a car), the processing time and the successful detection rate for each stage may vary. More specifically, in identifying a specific object, such as a face of a person, a person, or a car, the shape of the identification target area may vary. In other words, the identification target area may be oriented in a portrait orientation or in a landscape orientation. In addition, in identifying a specific object such as a face of a person, a person, or a car, the size of the characteristic amount thereof may vary. Furthermore, due to the affect from the variation in the shape of the identification target area and the size of the characteristic amount, the processing time may vary. In addition, during learning for each identification target, the successful detection rate may vary. Accordingly, the operation rate of a stage, which has been sufficiently efficient before the identification target is changed, may become inefficient after changing the identification target.

SUMMARY OF THE INVENTION

The present invention is directed to an information processing apparatus and an information processing method capable of improving processing efficiency.

According to an aspect of the present invention, an information processing apparatus includes a plurality of information processing units each including one or more processing execution units, each of which is configured to execute information processing, a control unit configured, based on a result of information processing executed by one of the plurality of information processing units, to determine whether to execute subsequent information processing by another one of the plurality of the information processing units, a successful detection rate storage unit configured to store as a successful detection rate a predetermined probability of determination by the control unit for executing the subsequent processing, a processing time storage unit configured to store a predetermined processing time for each of the processing execution units, and a calculation unit configured to calculate a configuration of the processing execution unit of the information processing unit according to the successful detection rate and the processing time.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the invention.

FIG. 3 illustrates various exemplary processing conditions and an exemplary module configuration according to an exemplary embodiment of the present invention.

FIGS. 4A through 4C illustrate an operation status of an identification device in an example 1 illustrated in FIG. 3.

FIGS. 5A and 5B illustrate an operation status of an identification device in an example 2 illustrated in FIG. 3.

FIG. 7 illustrates an operation status of an identification device having a conventional module configuration in an example 4 illustrated in FIG. 3.

FIG. 8 illustrates an example of a method for determining a module configuration in the example 1 illustrated in FIG. 3.

FIG. 9 illustrates an example of a method for determining a module configuration in the example 3 illustrated in FIG. 3.

FIGS. 13A through 13D illustrate an outline of the Viola & Jones method.

FIG. 15 illustrates an exemplary configuration of a control unit and a processing unit of a conventional information processing apparatus.

DETAILED DESCRIPTION OF THE EMBODIMENTS

Various exemplary embodiments, features, and aspects of the invention will be described in detail below with reference to the drawings.

To begin with, the principle and cause of impediments to increase in the speed of processing in chronologically paralleled cascade processing if the Viola & Jones method is used will be described in detail below with reference to FIG. 13C and Table 1 for easier understanding of the effect of an exemplary embodiment of the present invention.

TABLE 1

| | Processing time | Successful detection rate | Cumulative Successful detection rate |
|---|---|---|---|
| Stage 0 | 1 | 1/2 | 1 |
| Stage 1 | 1 | 1/2 | 1/2 |
| Stage 2 | 1 | 1/2 | 1/4 |

Figure 13B:
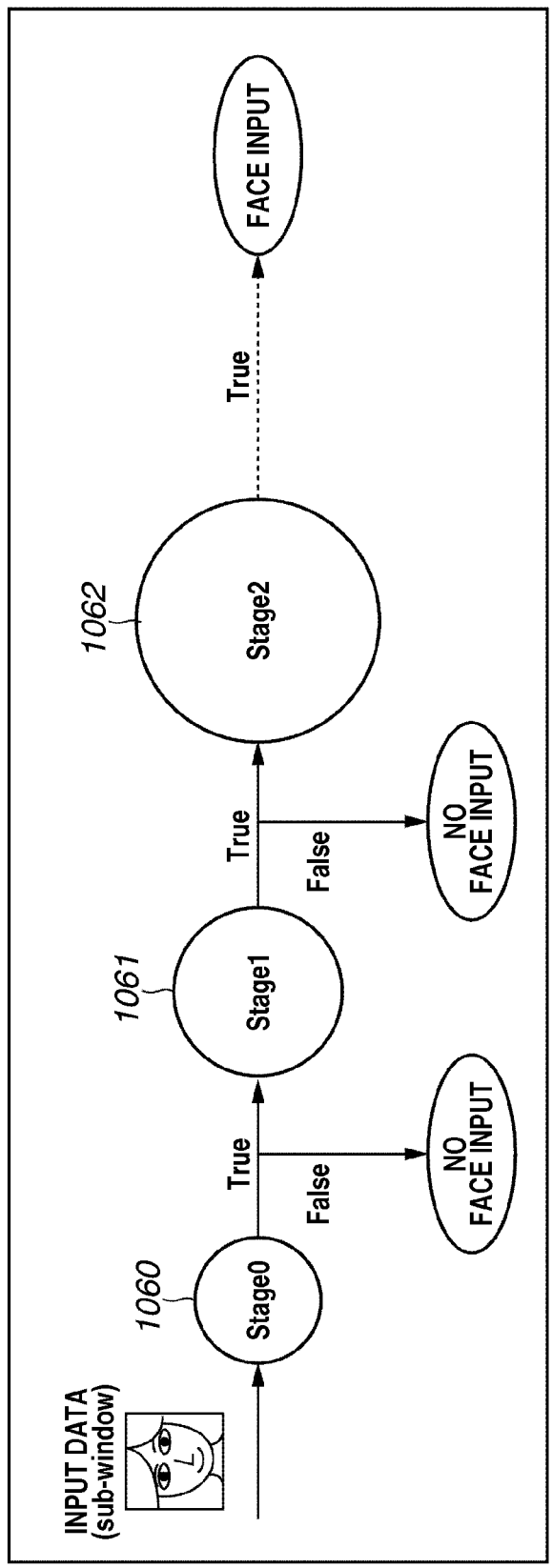
Figure 13C:
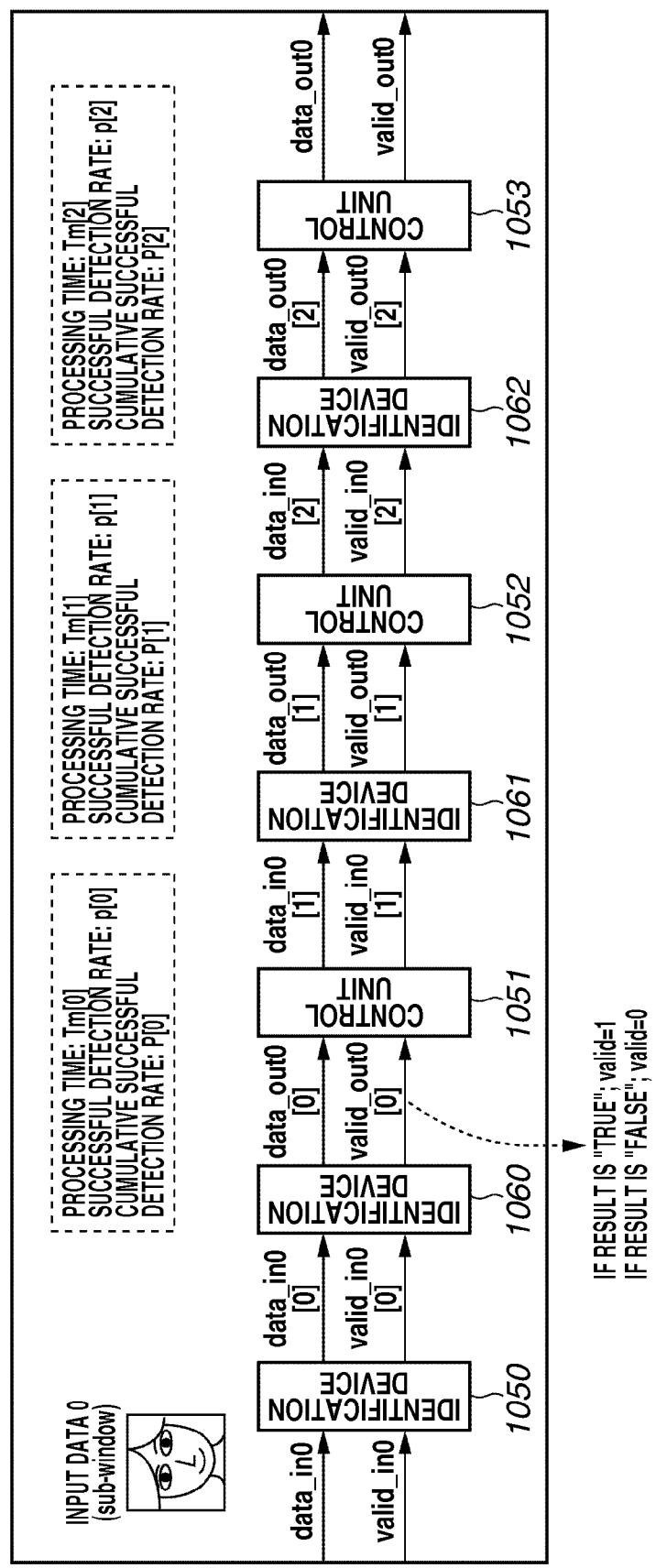
Figure 14:
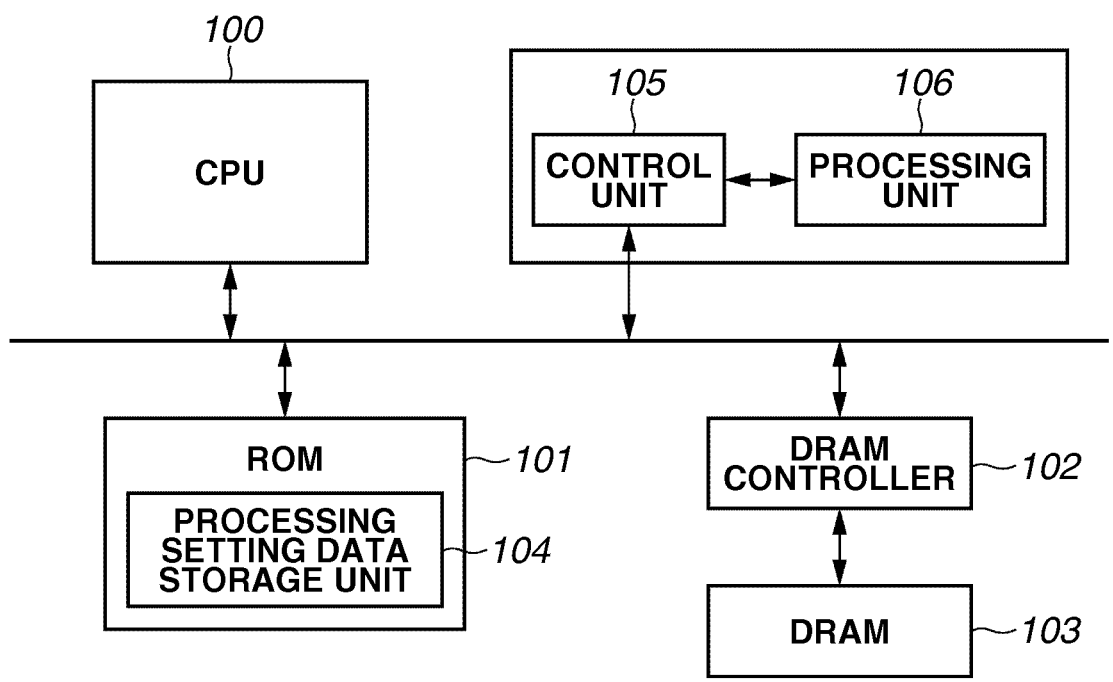
FIG. 14 is a block diagram illustrating an example of a conventional information processing apparatus configured to change identification target data.

Under the conditions described in Table 1, in the example illustrated in FIG. 13C, processing time taken in processing by an identification device in each stage (T) and a successful detection rate (p) have the following relationship.

$$Tm[0]=Tm[1]=Tm[2]=1$$

$$p[0]=p[1]=p[2]=\tfrac{1}{2}.$$

In the present exemplary embodiment, it is supposed that all the processing time T have the same value. Accordingly, the above-described limitation in processing (such limitation that the processing time that is the longest of the processing time of all the stages limits the total processing time) does not arise in chronologically paralleled processing. However, because all the successful detection rates have the same value "½", the following values of the cumulative successful detection rate are obtained: $P[0]=1$, $P[1]=\tfrac{1}{2}$, and $P[2]=\tfrac{1}{4}$. Accordingly, if a value "100" is set to the total number of processing executed by the identification devices 1060, then the total number of processing executed by each of the identification devices 1061 and 1062 are calculated by multiplying the total number of processing executed by the identification device 1060 with the cumulative successful detection rate as follows:

the total number of processing executed by the identification device $1061=100 \times P[1]=100 \times \tfrac{1}{2}=50$ the total number of processing executed by the identification device $1062=100 \times P[2]=100 \times \tfrac{1}{4}=25$.

Now, if the processing time T (=1) indicates the processing time for one cycle, then while the identification device 1060 executes one hundred processing in one hundred cycles, the identification devices 1061 and 1062 are idled for 50 and 75 cycles, respectively. More specifically, in executing processing whose successful detection rate is less than 1 (100%) in cascade processing, the operation rate of the processing in later stages of the pipeline may decrease, which may result in processing inefficiency.

Now, an example of a method for further increasing the processing speed by combining spatially paralleled processing to chronologically paralleled processing will be described in detail below with reference to FIG. 15. In the present exemplary embodiment, it is intended to quadruple the processing speed by using four pipelines.

In the example illustrated in FIG. 15, all the modules are provided to all of the identification devices 1060 through 1062 included in the processing unit 106.

Furthermore, in the example illustrated in FIG. 15, the control units 1050 through 1053 transmit the input data via the data lines and the valid lines for each pipeline. In other words, the control units 1050 through 1053 transmit the data "data_out0[0]" via the data line ("data_in0[1]") and transmit the control signal valid_out0[0] via the valid line ("valid0[1]") (i.e., data_out0[0]→data_in0"[1], valid_out0[0]→valid_in0[1], data_out0[1]→"data_in0"[2], valid_out0[1]→valid_in0[2])). If the values of the processing time and the successful detection rate described above in Table 1 have been obtained, then a part of the identification devices (those illustrated in a shaded state in FIG. 15) are idled due to the identification result "False" output by the identification device on the previous stage.

More specifically, in spatially paralleled processing including a plurality of pipelines, the processing inefficiency, in which the operation rate in the later pipelines decreases, may very often occur. As described above, the conventional method has the defectives caused due to the above-described principle.

Figure 1:
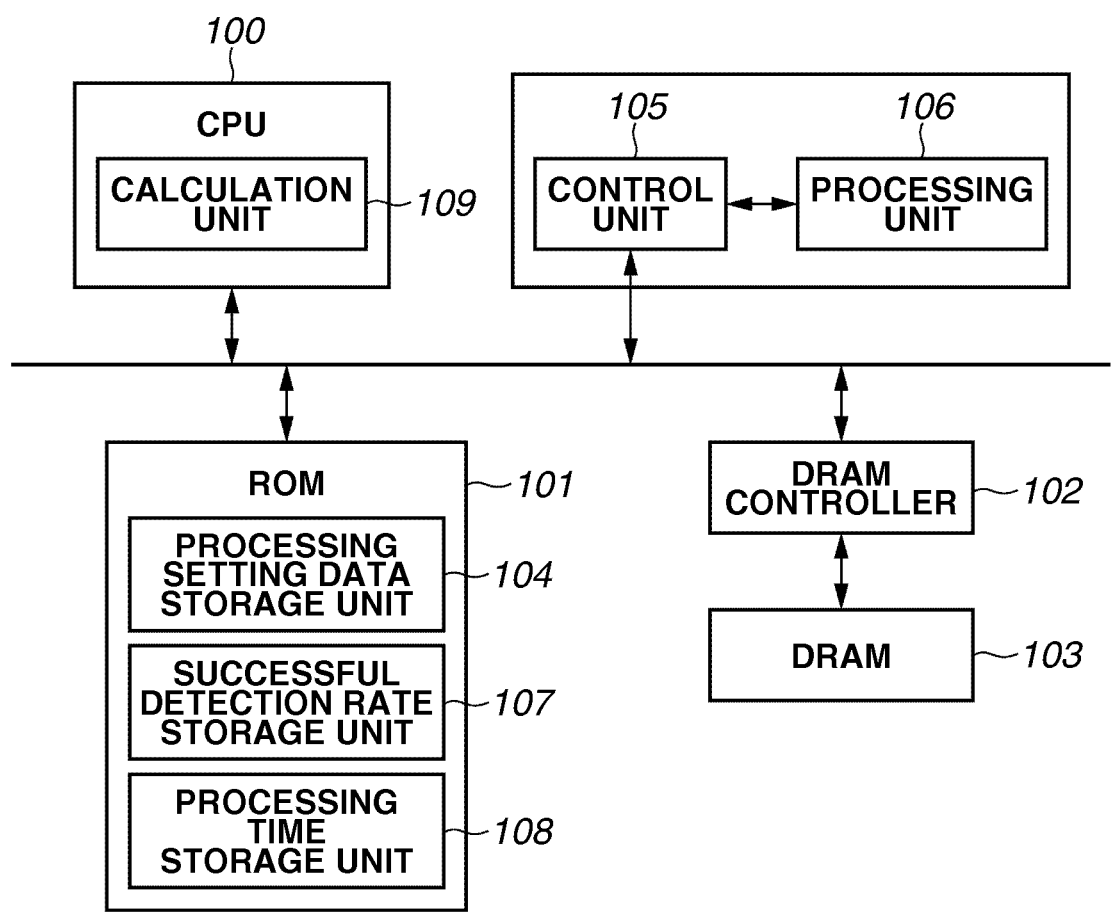
FIG. 1 is a block diagram illustrating an exemplary configuration of an information processing apparatus according to an exemplary embodiment of the present invention.

Now, an exemplary embodiment of the present invention will be described in detail below with reference to the drawings. To begin with, a first exemplary embodiment of the present invention will be described in detail below. FIG. 1 is a block diagram illustrating an exemplary configuration of an information processing apparatus according to the present exemplary embodiment.

The information processing apparatus includes a CPU 100, a ROM 101, a DRAM controller 102, a DRAM 103, a control unit 105, and a processing unit 106. The ROM 101 includes a processing setting data storage unit 104, a successful detection rate storage unit 107, and a processing time storage unit 108. The CPU 100 can function as a calculation unit 109 by executing a calculation program stored on the ROM 101.

The successful detection rate storage unit 107 stores a previously acquired successful detection rate (the probability of execution of the subsequent processing based on a result of arbitrary processing). The processing time storage unit 108 stores the processing time of each processing, which has been previously acquired.

The calculation unit 109 calculates a module configuration for executing each processing based on the successful detection rate stored on the successful detection rate storage unit 107 and the processing time stored on the processing time storage unit 108. The processing setting data storage unit 104 stores setting data of a characteristic amount and setting data of positional information about (the address of) image data.

In the information processing apparatus according to the present exemplary embodiment, the CPU 100, at the start of identification processing, acquires the setting data of a characteristic amount from the processing setting data storage unit 104. In addition, the CPU 100 set the acquired setting data on an identification device (a processing execution unit) included in the processing unit 106. Furthermore, the CPU 100 acquires setting data of positional information about (the address of) image data. Furthermore, the CPU 100 sets the acquired setting data on the control unit 105.

After completing the setting of the control unit 105 and the processing unit 106, the CPU 100 notifies the control unit 105 and the processing unit 106 that the processing has been started. Then, the control unit 105 accesses the DRAM controller 102 based on the image data positional information (the address) set thereon. Accordingly, the control unit 105 serially reads data of rectangular areas from the image data stored in the DRAM 103. In addition, the control unit 105 transfers the read rectangular area image data to the processing unit 106. After receiving the rectangular area image data from the control unit 105, the processing unit 106 serially executes identification processing on the received rectangular area image data.

If identification target data is to be changed, the control unit 105 notifies the CPU 100 that identification target data is to be changed. After receiving the notification from the control unit 105, the CPU 100, similarly to the operation described above, acquires setting data of a characteristic amount corresponding to new identification target data from the processing setting data storage unit 104. In addition, the CPU 100 sets the acquired setting data on an identification device provided in the processing unit 106. Furthermore, the CPU 100 acquires setting data of positional information of image data corresponding to the new identification target data from the processing setting data storage unit 104. In addition, the CPU 100 sets the acquired setting data on the control unit 105. In the above-described manner, the identification target data can be changed.

In executing processing whose successful detection rate and/or the processing time differs according to each processing stage, such as face detection, the calculation unit 109 uses the successful detection rate storage unit 107 and the processing time storage unit 108 to calculate a module configuration. The CPU 100 executes data processing such as face detection processing based on the calculated module configuration.

Figure 2:
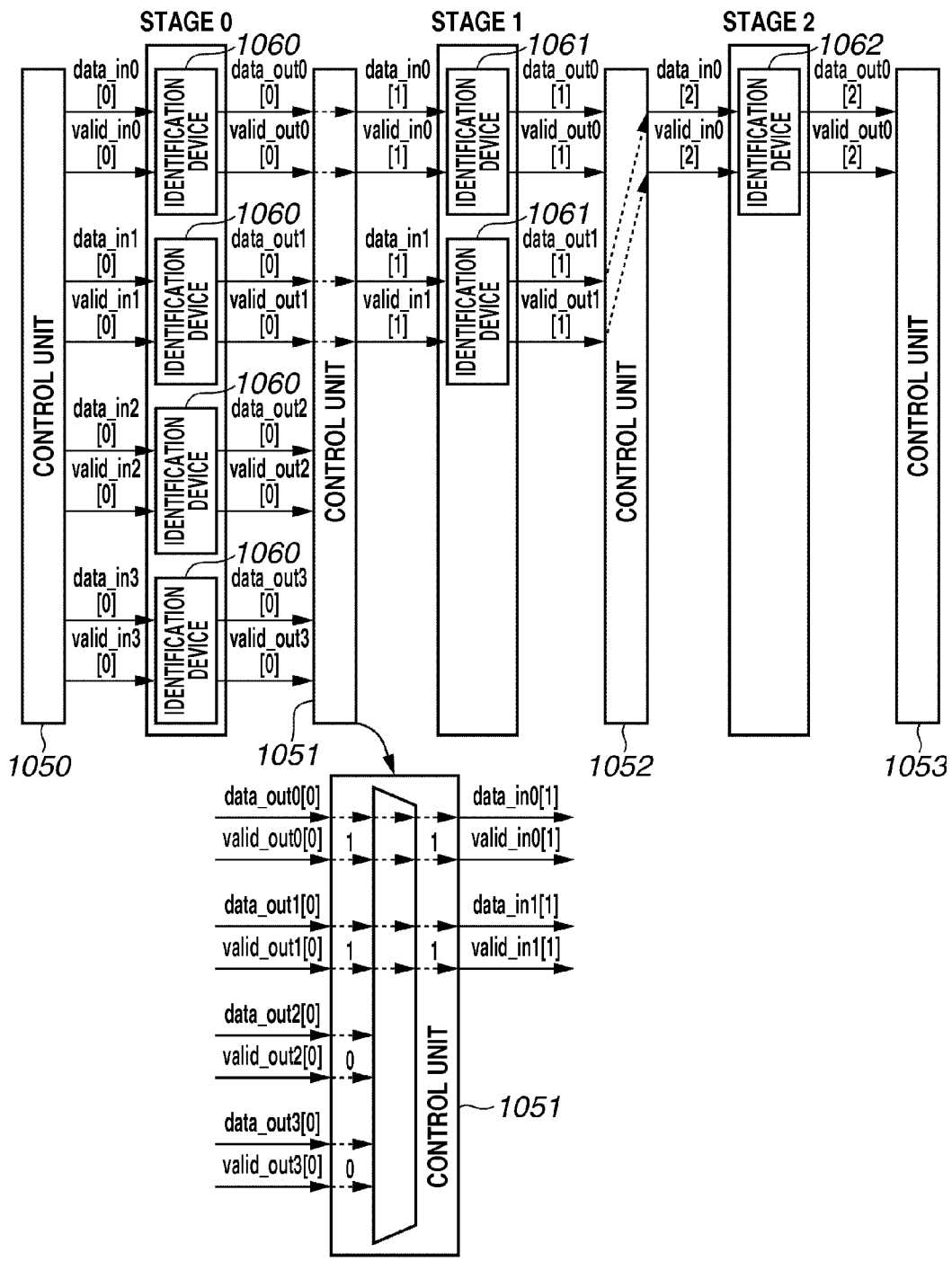
FIG. 2 illustrates an exemplary configuration of a control unit and a processing unit according to an exemplary embodiment of the present invention.

Now, processing executed by the calculation unit 109 for calculating a module configuration will be described in detail below. FIG. 2 illustrates an exemplary configuration of a control unit and a processing unit according to the present exemplary embodiment.

Let "Tm[N]" be the processing time of each identification device provided at a stage N. Let "P[N]" be the cumulative successful detection rate at the stage N. Then, an average processing time "Td[N]" necessarily taken by one identification device in processing one piece of input data (rectangular image data) at the stage N can be expressed by the following expression (1):

$$Td[N] = Tm[N] \times P[N] \qquad (1).$$

Because Td[N] denotes an average processing time taken by each identification device, if a plurality of identification devices (modules) capable of executing processing of the same stage, the processing at the stage can be sharedly executed by the plurality of identification devices.

Therefore, letting "Num[N]" be the number of identification devices (modules) provided at the stage N, then the processing time "T[N]" for one piece of input data (rectangular image data) at the stage N can be expressed by the following expression (2):

$$T[N] = Td[N]/\text{Num}[N] = (Tm[N] \times P[N])/\text{Num}[N] \qquad (2).$$

As described above, in order to increase the efficiency of executing chronologically paralleled processing, it is useful if the processing time lengths taken at each stage are evenly set. In other words, it is useful if Num[N] is determined so that T[N] (i.e., "T×P/Num") becomes even for all stages.

In the present exemplary embodiment, the calculation unit 109 uses the successful detection rate storage unit 107 and the processing time storage unit 108 to calculate a module configuration (an appropriate number of identification devices for each stage). In addition, in the present exemplary embodiment, an information processing unit includes at least one identification device for each stage.

Now, a method will be described in detail below that is executed by the calculation unit 109 for calculating the number of identification devices (modules) to be provided in stages 0 through 2 (Num[0], Num[1], and Num[2]) based on information about the processing time Tm and the cumulative successful detection rate P for each identification device in the example 1 illustrated in FIG. 3. The information about the processing time Tm and the cumulative successful detection rate P are the same as described above in Table 1.

In order to set an even processing time for all stages, it is necessary to determine Num[0], Num[1], and Num[2] so that the following expression (3) is satisfied:

$$Tm[0] \times P[0])/Num[0] = (Tm[1] \times P[1])/Num[1] \qquad (3)$$
$$= (Tm[2] \times P[2])/Num[2].$$

Substitution of the processing time Tm and the cumulative successful detection rate P for one identification device in the example 1 into the expression (3) leads to the following expression:

$$(1 \times 1)/Num[0] = (1 \times 1/2)/Num[1]$$
$$= (1 \times (1/2 \times 1/2))/Num[2],$$

which then leads to the following expression (4):

$$Num[0]:Num[1]:Num[2] = 4:2:1 \qquad (4).$$

Therefore, if the number of identification devices (modules) are provided for each stage at the ratio expressed by the expression (4), then the number of modules to be idled can be reduced to a small number. The calculation unit 109 can calculate the above-described expression (4) based on the cumulative successful detection rate and the processing time for each identification device respectively stored on the successful detection rate storage unit 107 and the processing time storage unit 108.

Now, a method for executing identification processing in the module configuration calculated in the above-described manner will be described in detail below.

After the number of identification devices to be provided at each stage is determined in the above-described manner, the control device 1050 transmits four pieces of rectangular image data to the stage 0 in order to execute spatially paralleled processing. In the present exemplary embodiment, the four pieces of rectangular image data includes data_in0, 1, 2, and 3. Furthermore, valid signals valid_in0, 1, 2, and 3 are transmitted in association with the data_in0, 1, 2, and 3. At the stage 0, the data signal and the valid signal corresponding to each other exist. Accordingly, the control device 1050 is connected to each corresponding identification device.

When valid data is input to a specific identification device, the identification device executes True/False identification processing. The identification device outputs a result of the identification processing as control signals valid_out0, 1, 2, and 3. In the present exemplary embodiment, a reference numeral index "[0]" is added to an output of an identification device at the stage 0. Then, because the successful detection rate p at the stage 0=½, two of the four identification devices output a result "True" and the other two output a result "False".

Then, a control device 1051 connects the identification device that has output an identification result "True" (valid_out=1) at the stage 0 to two identification devices provided for the stage 1. At this timing, processing at the stage 1 starts. More specifically, if valid_out0[0]=valid_out0[1]=1 and if valid_out0[2]=valid_out0[3]=0, then the identification devices are connected as follows:

data_out0[0]→data_in0[1]

valid_out0[0]→valid_in0[1]

data_out1[0]→data_in1[1]

valid_out1[0]→valid_in1[1].

Then, because the successful detection rate p at the stage 1=½, one identification device of the two identification devices provided for the stage 1 outputs a identification result "True" while the other outputs "False". Then, a control device 1052 connects the identification device that has output an identification result "True" (valid_out=1) at the stage 1 to one identification device provided for the stage 2. At this timing, processing at the stage 2 starts.

More specifically, if valid_out1[0]=0 and valid_out1[1]=0, then the identification devices are connected as follows:

data_out1[0]→data_in0[2]

valid_out1[0]→valid_in0[2].

The present exemplary embodiment executes identification processing in the above-described manner.

Now, a difference in the operation state between the module configuration of the conventional method illustrated in FIG. 15 and a module configuration illustrated in FIG. 2, which is calculated by the calculation unit 109 according to the present exemplary embodiment, will be described in detail below with reference to FIGS. 4A through 4C. FIGS. 4A through 4C illustrate an operation state of the identification device in the example 1 illustrated in FIG. 3. In each of FIGS. 4A through 4C, the time is taken on a horizontal axis (extended rightwards in the drawing) and the number of spatially paralleled processing (the number of modules that operate in parallel to one another in a unitary time period) is taken on a vertical axis (extended downwards in the drawing).

In the module configuration of the conventional method illustrated in FIG. 4A, four identification devices are provided for each of stages 0 through 2 in order to set a value of the number of spatially paralleled processing "4" (i.e., four pipelines are provided). In the module configuration according to the present exemplary embodiment illustrated in FIG. 4C, the number of modules is determined according to the ratio calculated by the calculation unit 109 (i.e., "4:2:1") and the modules of the determined number are provided.

In the example 1 illustrated in FIG. 3, for the processing time of the identification devices 1060 through 1062, which execute processing at the stages 0 through 2, it is supposed that Tm[0]=Tm[1]=Tm[2]=1. Accordingly, the identification device 1061 executes the processing based on a result of the processing in time 1. Here, the processing time of the control devices 1050 through 1052 does not affect the difference between the total processing time lengths of the conventional method and the present exemplary embodiment. Accordingly, the description thereof is omitted.

In both the module configuration illustrated in FIG. 4A and that illustrated in FIG. 4C, the four identification devices 1060 start the processing. After the time 1 has elapsed, the identification devices 1060 output a processing result. Because the successful detection rate of the identification device 1060 is ½, two of the four identification devices 1060 output a processing result "True" while the other two outputs "False". Accordingly, in the module configuration illustrated in FIG. 4A, after the time 1 has elapsed, two of the four identification devices 1061 only start executing the processing.

Then, based on the results output from the two identification devices that have operated, only one of four identification devices 1062 starts the processing. Because pipeline processing is available, after the time 1, the four identification devices 1060 simultaneously start subsequent processing on input data.

The number of identification devices in operation in this case is illustrated in FIG. 4B. For the number of identification devices 1061 in operation in this case, none is in operation in the time 1. In time 2, two identification devices 1061 is in operation. After the time 2, two identification devices 1061 operate. For the number of identification devices 1062 in operation in this case, none is in operation in the time 1 and the time 2. After the time 2, one identification device 1062 operates.

Although not illustrated in the drawing, the number of the identification devices 1060 is always four. In other words, if the successful detection rate in the example 1 is always maintained (i.e., if the successful detection rate in the example 1 is always close to the set successful detection rate), then the number of identification devices is as illustrated in FIG. 4B. In other words, the maximum number of identification devices 1061 that simultaneously operate is two while the maximum number of identification devices 1062 that simultaneously operate is only one.

On the other hand, the module configuration according to the present exemplary embodiment include a pipeline to which no identification device is provided as illustrated in FIG. 4C. Accordingly, the control device executes the processing by connecting to a predetermined later-stage identification device according to whether the data input at the previous stage is valid.

The processing performance of the module configuration of the conventional method (FIG. 15) and that according to the present exemplary embodiment (FIG. 2) are similar. Accordingly, the present exemplary embodiment can implement the similar processing performance with a circuit configuration smaller than that of the conventional method.

More specifically, because it is not necessary to provide a module to be idled in the present exemplary embodiment, the present exemplary embodiment can implement a processing module configuration more appropriate than that of the conventional method.

Because the successful detection rate may vary according to the validity of the input data, the number of the operating modules illustrated in FIGS. 4A and 4B does not always apply. However, in executing identification processing on all images, the set successful detection rate may be achieved on average. Accordingly, by using the module configuration calculated by the calculation unit 109, it is not necessary in the present exemplary embodiment to provide a wasteful processing module with substantially the same processing time as that of the conventional method.

Now, a result of calculation of and an effect of the module configuration in examples 2 through 4 (FIG. 3), whose successful detection rate and processing time differ from those of the example 1 (FIG. 3) will be described in detail below. FIGS. 5A and 5B illustrate an exemplary operation state of the identification device in the example 2 illustrated in FIG. 3. Under the conditions in the example 2, the processing time T and the successful detection rate p at each stage have the following relationship:

$$Tm[0]=Tm[1]=Tm[2]=1$$

$$p[0]=3/4$$

$$p[1]=1/3$$

$$p[2]=1/4.$$

In the module configuration of the conventional method illustrated in FIG. 15, although four identification devices 1060 through 1062 each are provided, only three identification devices 1061 operate at the maximum. In other words, one of the four identification devices 1061 provided for the stage 1 is always idled. Similarly, three of the four identification devices 1062 are always idled.

On the other hand, in the present exemplary embodiment, the ratio "Num[0]:Num[1]:Num[2]=4:3:1" is obtained by the calculation by the calculation unit 109. The present exemplary embodiment determines the number of each of the identification devices 1060 through 1062 according to the result of the calculation by the calculation unit 109. In addition, the processing performance of the module configuration of the conventional method (FIG. 15) and that according to the present exemplary embodiment (FIG. 2) are similar.

As described above, if the lengths of the processing time of the stages 0 through 2 of the pipeline processing differs from one another, the total processing time is limited to the processing time for processing the stage whose processing time is the longest. Accordingly, in dividing processing into a plurality of stages, it is useful to divide the processing into stages so that the processing time lengths of the stages are the same as one another. However, in face detection processing, the processing time of each stage is determined by learning. Accordingly, the processing time lengths of the stages may not always be set to the same processing time length.

In order to alleviate the processing time difference, the calculation unit 109 calculates the number of the identification devices (modules) to be provided to execute processing of the stages according to the length of the processing time. Accordingly, the present exemplary embodiment can increase the degree of evenness of the processing time lengths of the plurality of stages. In the examples 3 and 4 described below, the stages have different processing time lengths.

Figure 6:
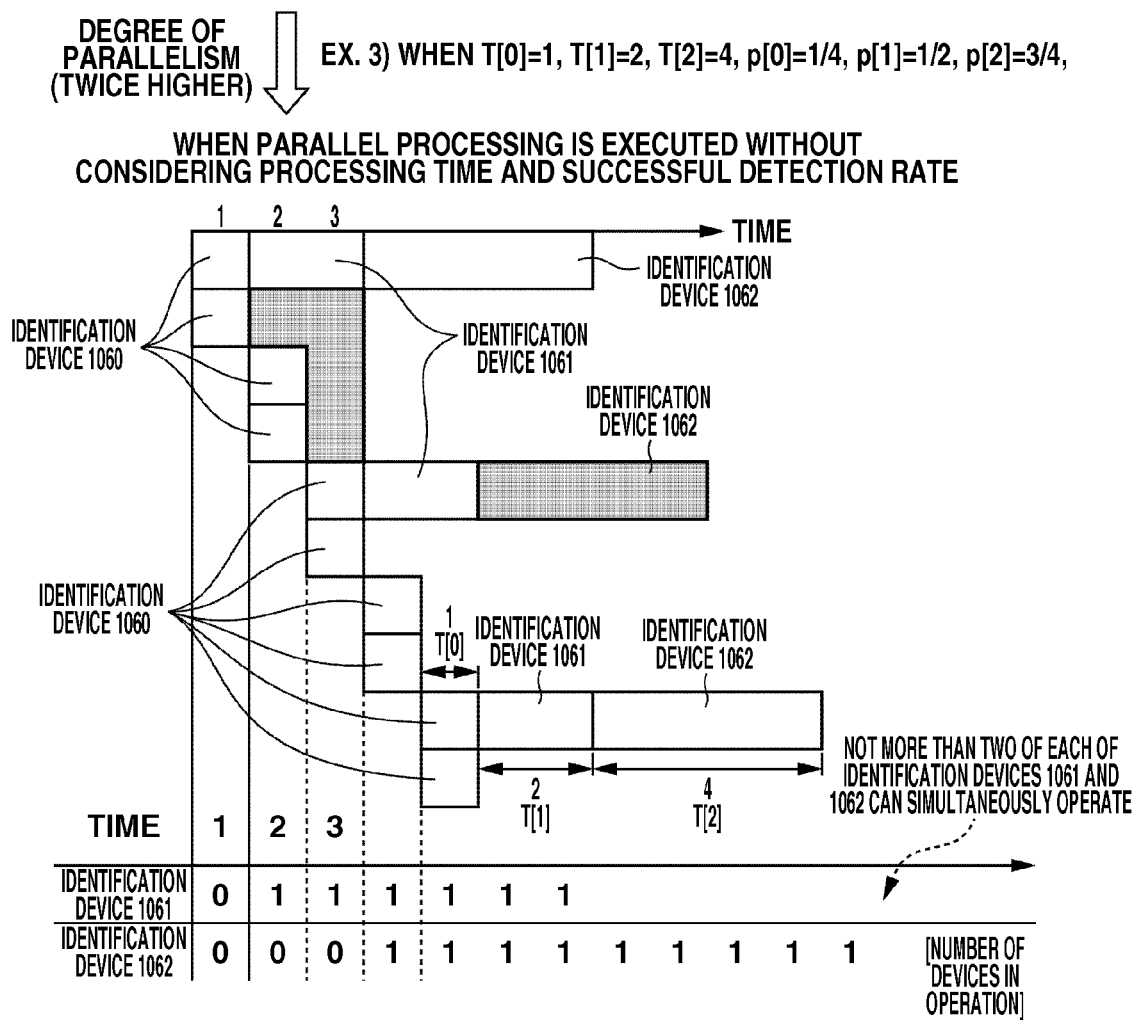
FIG. 6 illustrates an operation status of an identification device having a conventional module configuration in an example 3 illustrated in FIG. 3.

FIG. 6 illustrates an operation status of the identification device in the module configuration of the conventional method in the example 3 illustrated in FIG. 3.

Under the conditions of the example 3, a value "2" is set as the value of the number of paralleled processing. Accordingly, two identification devices 1060 through 1062 each are provided. Furthermore, under the conditions of the example 3, the processing time T and the successful detection rate p at each stage have the following relationship:

$$Tm[0]=1, Tm[1]=2, Tm[2]=4,$$

$$p[0]=1/4, p[1]=1/2, p[2]=3/4.$$

In other words, in the example 3, the stages have different processing time lengths.

In the module configuration of the conventional method illustrated in FIG. 15, although two identification devices 1060 through 1062 each are provided, only one identification device 1061 always operates. In other words, one of the two identification devices 1061 is always idled. Similarly, one of the two identification devices 1062 is always idled.

On the other hand, in the present exemplary embodiment, the ratio "Num[0]:Num[1]:Num[2]=2:1:1" is obtained by the calculation by the calculation unit 109 as illustrated in FIG. 3. The present exemplary embodiment determines the number of each of the identification devices 1060 through 1062 according to the result of the calculation by the calculation unit 109. In addition, the processing performance of the module configuration of the conventional method (FIG. 15) and that according to the present exemplary embodiment are similar.

FIG. 7 illustrates an operation status of the identification device in the module configuration of the conventional method in the example 4 illustrated in FIG. 3. Under the conditions of the example 4, a value "3" is set as the value of the number of paralleled processing. Accordingly, three identification devices 1060 through 1062 each are provided.

Furthermore, under the conditions of the example 4, the processing time T and the successful detection rate p at each stage have the following relationship:

$$Tm[0]=1, Tm[1]=2, Tm[2]=4,$$

$$p[0]=1/6, p[1]=1/2, p[2]=1/16.$$

In other words, in the example 4 also, the stages have different processing time lengths.

In the module configuration of the conventional method illustrated in FIG. 15, although two identification devices 1060 through 1062 each are provided, only one identification device 1061 always operates. In other words, one of the two identification devices 1061 is always idled. Similarly, one of the two identification devices 1062 is always idled.

In the module configuration of the conventional method illustrated in FIG. 15, although three identification devices 1060 through 1062 each are provided, only one identification device 1061 always operates. In other words, two of the three identification devices 1061 are always idled. Similarly, two of the three identification devices 1062 are always idled.

On the other hand, in the present exemplary embodiment, the ratio "Num[0]:Num[1]:Num[2]=3:1:1" is obtained by the calculation by the calculation unit 109 as illustrated in FIG. 3. The present exemplary embodiment determines the number of each of the identification devices 1060 through 1062 according to the result of the calculation by the calculation unit 109. In addition, the processing performance of the module configuration of the conventional method (FIG. 15) and that according to the present exemplary embodiment are similar.

As described above, the present exemplary embodiment provides the identification devices in the number that is determined according to the ratio of the numbers of the modules calculated by the calculation unit 109. Accordingly, the present exemplary embodiment can improve the efficiency of operation of the identification devices.

The ratio of the numbers of the modules may not have an integral value according to the number of modules that can be provided. Furthermore, even if the ratio of the numbers of the modules has an integral value, it may be impossible to provide the identification devices in the number equivalent to the calculated ratio due to the limitation on the total number of modules that can be provided. More specifically, if the total number of modules that can be provided is six in the above-described example 1, then the module configuration satisfying the ratio "4:2:1" cannot be implemented.

If the ratio of the number of the modules calculated by the calculation unit 109 does not have an integral value, or if the calculated total number of modules does not satisfy the ratio of the numbers of modules calculated by the calculation unit 109, it is useful to determine the ratio of the numbers of modules by executing the following method.

In assigning a predetermined number of identification devices into a plurality of stages, a plurality of alternative configurations exist as to what quantity of identification devices are to be assigned to which stage. In a first module quantity ratio determination method, the present exemplary embodiment extracts alternative configurations by which one or more identification devices are provided to all the stages from among all the alternative configurations. The condition for extracting the above-described alternative configuration is appropriate because if any stage is not provided with an identification device, the processing may not be completed.

In order to determine a useful configuration from among the alternative configurations extracted by the above-described first module quantity ratio determination method, the present exemplary embodiment executes a second module quantity ratio determination method described below. In the second module quantity ratio determination method, the present exemplary embodiment calculates the processing time T [N] for processing one piece of input data (rectangular image data) at the stage N for all the stages by using the above-described expression (2). Furthermore, the present exemplary embodiment sets the maximum value of the calculated values of the processing time T[N] as a first processing time of the alternative configuration.

As described above, because the maximum processing time length of the processing time lengths of all the stages limits the total processing time length in executing pipeline processing, it is appropriate and useful to set the maximum value of the stage processing time length values (the first processing time) as the entire processing time length value.

In addition, the present exemplary embodiment extracts an alternative whose first processing time value is smallest from among all the alternative configurations extracted by the first module quantity determination method. Furthermore, the present exemplary embodiment determines the alternative configuration extracted by the second module quantity determination method as the module configuration to be applied. More specifically, the present exemplary embodiment calculates sequences each including values of the expression "T[N]×P[N]/Num[N]", which are arranged in descending order, for each alternative configuration. Furthermore, the present exemplary embodiment compares the values of the terms of each sequence starting from the first term. In addition, the present exemplary embodiment extracts a sequence having a value of a smallest term. However, if a plurality of alternative configurations have been extracted as a result of the above-described second module quantity determination method, the present exemplary embodiment further applies a third module quantity determination method described below.

In the third module quantity determination method, the present exemplary embodiment calculates the processing time T [N] for processing one piece of input data (rectangular image data) at the stage N for all the stages by using the above-described expression (2). Furthermore, the present exemplary embodiment sets a value second largest of the values calculated in the above-described manner as a value of a second processing time of the alternative configuration. In addition, the present exemplary embodiment extracts an alternative configuration whose second processing time value is smallest from among all the alternative configurations extracted in the second module quantity determination method. Moreover, the present exemplary embodiment determines the alternative configuration extracted by the third module quantity determination method as the module configuration to be applied.

If a plurality of alternative configurations remain after executing the third module quantity determination method, then the present exemplary embodiment executes comparison similar to that described above by using a third largest value (third processing time), a fourth largest value (fourth processing time), and so on. In this case, the present exemplary embodiment completes the extraction when only one alternative configuration whose N-th processing time value is the smallest remains.

If a plurality of alternative configurations remain even after the above-described comparison is executed on all the stages, the present exemplary embodiment arbitrarily select one alternative configuration from among the plurality of alternative configurations and determines the extracted alternative configuration as the module configuration to be applied. More specifically, if a plurality of sequences have been selected even after the comparison on the last terms thereof are completed, then the present exemplary embodiment determines the module configuration according to the number of modules corresponding to either one of the selected plurality of sequences.

Now, an example of a method executed in this case will be described in detail below with reference to FIGS. 8 and 9. FIG. 8 illustrates an exemplary method in which the above-described method is applied in the example 1 illustrated in FIG. 3. Under the conditions of the example 1, the ratio of the numbers of the modules is "Num[0]:Num[1]:Num[2]=4:2:1". In this case, supposing that six identification devices are provided, the present exemplary embodiment determines the module configuration in the following manner.

As the alternative configurations as to what quantity of modules are to be assigned to each of the stages 0 through 2, in the first module quantity determination method, the present exemplary embodiment extracts alternative configurations 1 through 10, by which at least one identification device is provided to all the stages. In the second module quantity determination method, the present exemplary embodiment calculates the processing time T[N] for one piece of input data (rectangular image data) input at the stage N for all the stages by using the expression (2).

In addition, the present exemplary embodiment sets the highest value of the values of the processing time T[N] as the first processing time of the alternative configuration. Furthermore, the present exemplary embodiment extracts an alternative configuration whose first processing time value is the smallest of all the alternative configurations extracted by the first module quantity determination method. In the example illustrated in FIG. 8, only one alternative configuration has a stage processing time maximum value of ⅓, which is smaller than those of the other alternative configurations. Accordingly, the present exemplary embodiment determines the alternative configuration 2 as the module configuration to be applied.

FIG. 9 illustrates an exemplary method in which the above-described method is applied in the example 3 illustrated in FIG. 3. Under the conditions of the example 3, the ratio of the numbers of the modules is "Num[0]:Num[1]:Num[2]=2:1:1". In this case, supposing that six identification devices are provided, the present exemplary embodiment determines the module configuration in the following manner. In the example illustrated in FIG. 9 also, as the alternative configurations as to what quantity of modules are to be assigned to each of the stages 0 through 2, in the first module quantity determination method, the present exemplary embodiment extracts alternative configurations 1 through 10, by which at least one identification device is provided to all the stages.

In the second module quantity determination method, the present exemplary embodiment calculates the processing time T[N] for one piece of input data (rectangular image data) input at the stage N for all the stages by using the expression (2). In addition, the present exemplary embodiment sets the highest value of the values of the processing time T[N] as the first processing time of the alternative configuration. Furthermore, the present exemplary embodiment extracts an alternative configuration whose first processing time value is the smallest of all the alternative configurations extracted by the first module quantity determination method.

In the example illustrated in FIG. 9, six alternative configurations have a stage processing time maximum value of ½, which is smaller than those of the other alternative configurations. Accordingly, the present exemplary embodiment cannot determine the module configuration at this timing. Accordingly, the present exemplary embodiment executes the third module quantity determination method. In the third module quantity determination method, the present exemplary embodiment compares second longest stage processing time lengths.

In the example illustrated in FIG. 9, only one alternative configuration has a second largest stage processing time maximum value of ¼, which is smaller than those of the other alternative configurations. Accordingly, the present exemplary embodiment determines the alternative configuration 5 as the module configuration to be applied. By executing the above-described module quantity determination method, the present exemplary embodiment can select an appropriate module configuration.

Figure 10A:
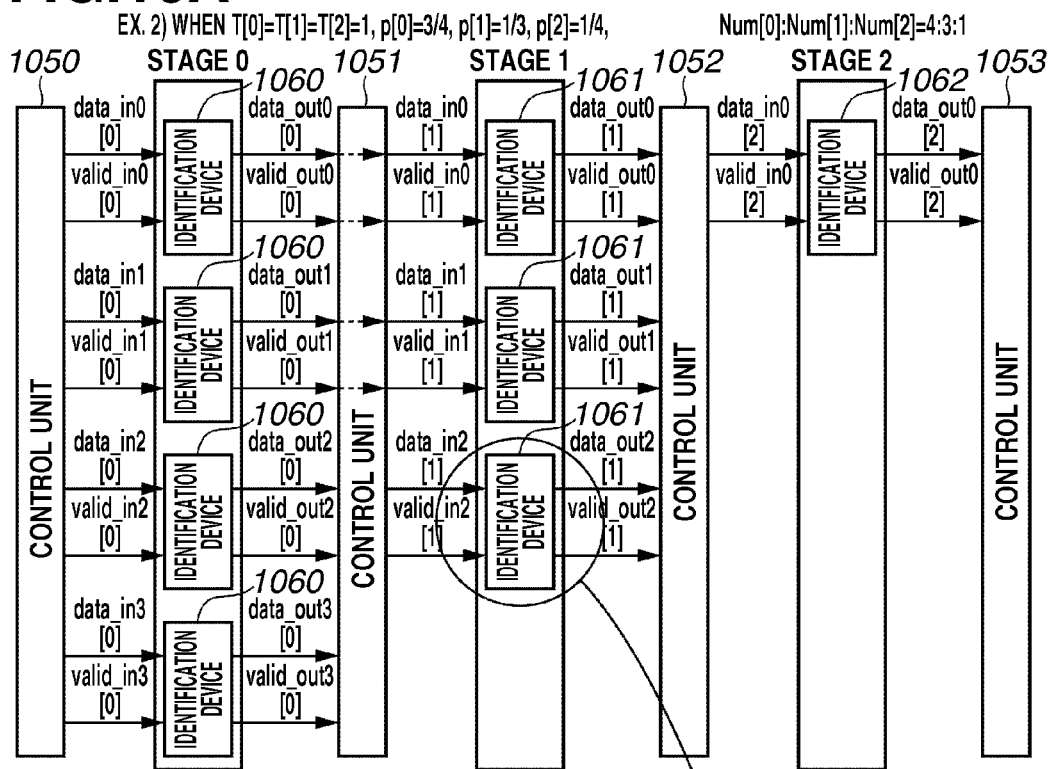
FIGS. 10A and 10B illustrate an exemplary change of the module configuration when the processing condition is changed from the example 2 to the example 3 in FIG. 3
Figure 10B:
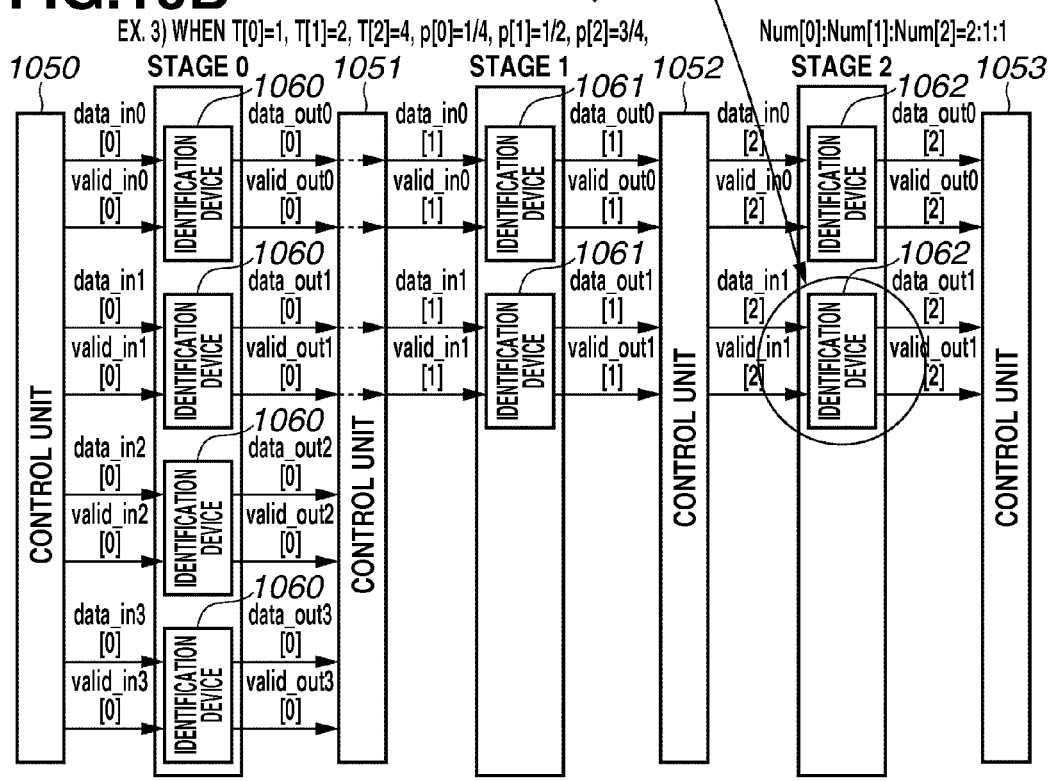

Now, an exemplary operation of the present exemplary embodiment executed if the identification target has been changed will be described in detail below. In the present exemplary embodiment, it is supposed that the condition has been changed from the example 2 to the example 3. The change like this is equivalent to a case where the identification target has been changed from the face of a person to a person. FIG. 10A illustrates the module configuration determined according to the number of modules calculated by the calculation unit 109 under the conditions of the example 2. FIG. 10B illustrates the module configuration determined according to the number of modules calculated by the calculation unit 109 under the conditions of the example 3.

The identification target (from the example 2 (a person's face) to the example 3 (a person)) can be changed by changing one of the identification device 1061 provided for the stage 1 (FIG. 10A) to the identification device 1062 provided for the stage 2 (FIG. 10B).

Now, an exemplary method for changing the module configuration will be described in detail below with reference to FIG. 11. The example illustrated in FIG. 11A corresponds to the module configuration in the example 2 while the example illustrated in FIG. 11B corresponds to the module configuration in the example 3.

Figure 11A:
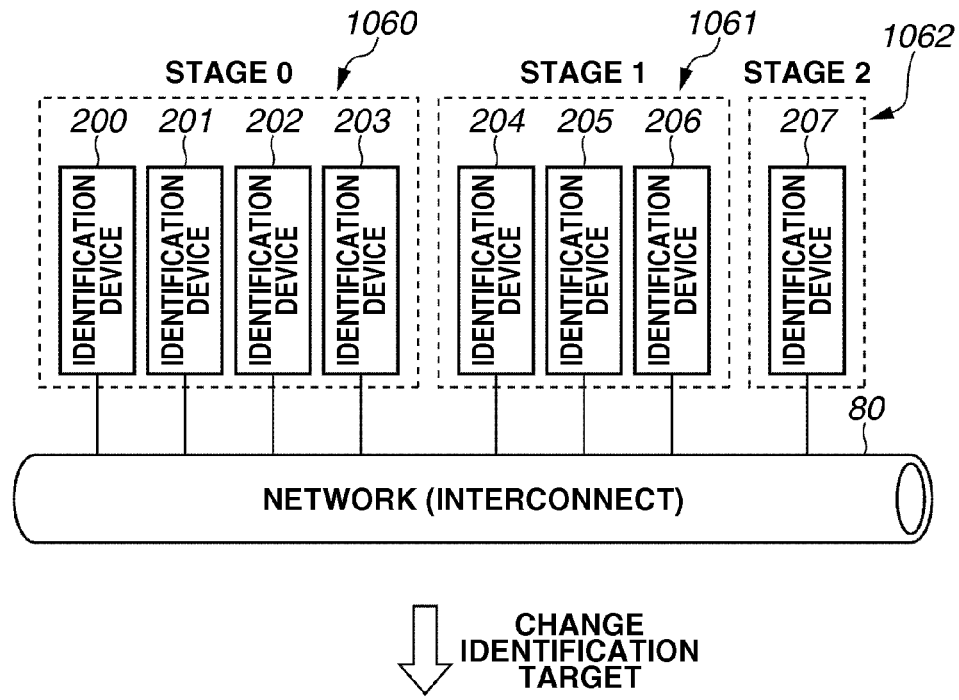
FIGS. 11A and 11B illustrate an exemplary change of the allocation of the identification device when the processing condition has been changed from the example 2 to the example 3 in FIG. 3
Figure 11B:
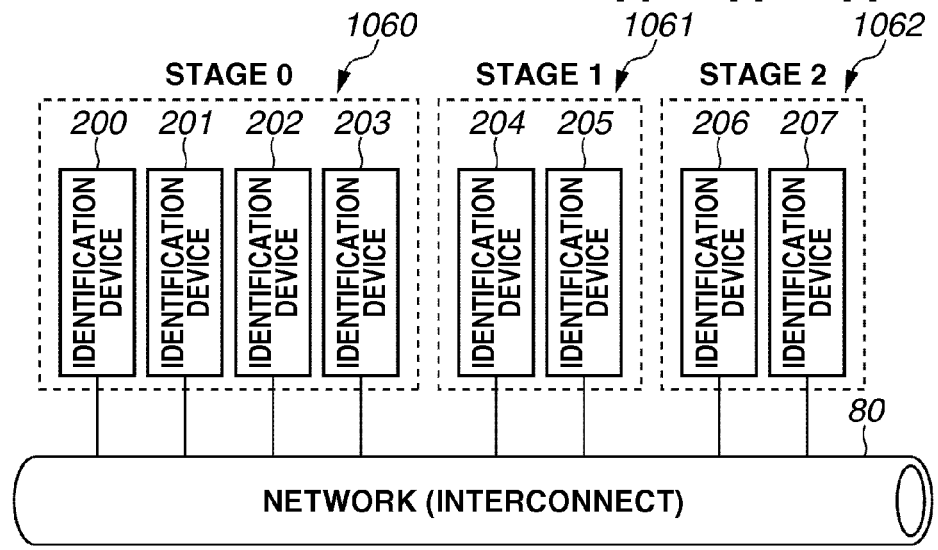

Referring to FIG. 11A, eight identification devices 200 through 207 are provided. In addition, four identification devices 1060, three identification devices 1061, and one identification device 1062 are provided for executing processing in each of the stages 0 through 2 in the example 2 according to the processing time and the successful detection rate set for each stage. In changing the identification target from the identification target in the example 2 (a person's face) to the identification target in the example 3 (a person), the present exemplary embodiment changes the numbers of each of the identification devices 1060 through 1062, which have been provided to execute the processing in each stage, to four, two, and two, respectively, as illustrated in FIG. 11B.

Now, the implementation of the components of the information processing apparatus capable of changing the module configuration in the above-described manner will be described in detail below. As illustrated in FIGS. 11A and 11B, the identification devices are connected to a network (Interconnect) 80. In addition, if identification processing is currently executed on specific rectangular image data, each of the identification devices transmits status information indicating that the identification processing is currently executed to the network (Interconnect) 80.

The method for determining the destination (identification device) of transmission of a result of identification processing by a specific identification device (the connection relationship (topology) among the identification devices) can be implemented by using a communication path setting unit provided on the network (Interconnect) 80.

For example, in the module configuration illustrated in FIG. 11A (the example 2), the present exemplary embodiment sets the setting so that the output from the identification devices 200 through 203, each of which is provided to execute the processing at the stage 0, is to be transmitted to the identification devices 204 through 206, each of which executes the processing at the stage 1. In addition, the present exemplary embodiment sets the setting so that the output from the identification devices 204 through 206 are transmitted to the identification device 207, which executes the processing at the stage 2. Furthermore, the present exemplary embodiment determines the content of the setting according to a result of the calculation (as to the module configuration) executed by the calculation unit 109.

In order to change the identification target, in changing the configuration of the example 2 (a person's face) to that of the example 3 (a person), it is useful to change the content of the setting set by the communication path setting unit according to the result of the calculation (module configuration) newly acquired by the calculation by the calculation unit 109. More specifically, it is useful if the content of the setting set by the communication path setting unit so that the outputs of the identification devices 200 through 203 are transmitted to the identification devices 204 and 205 and that the outputs of the identification devices 204 and 205 are transmitted to the identification devices 206 and 207. Thus, the present exemplary embodiment can implement the module configuration illustrated in FIG. 11B (the example 3).

If a plurality of transmission destinations have been set, the network (Interconnect) 80 executes control for selecting one identification device from among the identification devices that have not transmitted status information indicating that the identification processing is currently executed (i.e., the identification devices that have not asserted a "busy" signal) and for establishing a connection. However, if all the transmission destinations are currently executing identification processing, the network (Interconnect) 80 establishes a connection after extracting at least one identification device that is not currently executing identification processing.

Figure 12:
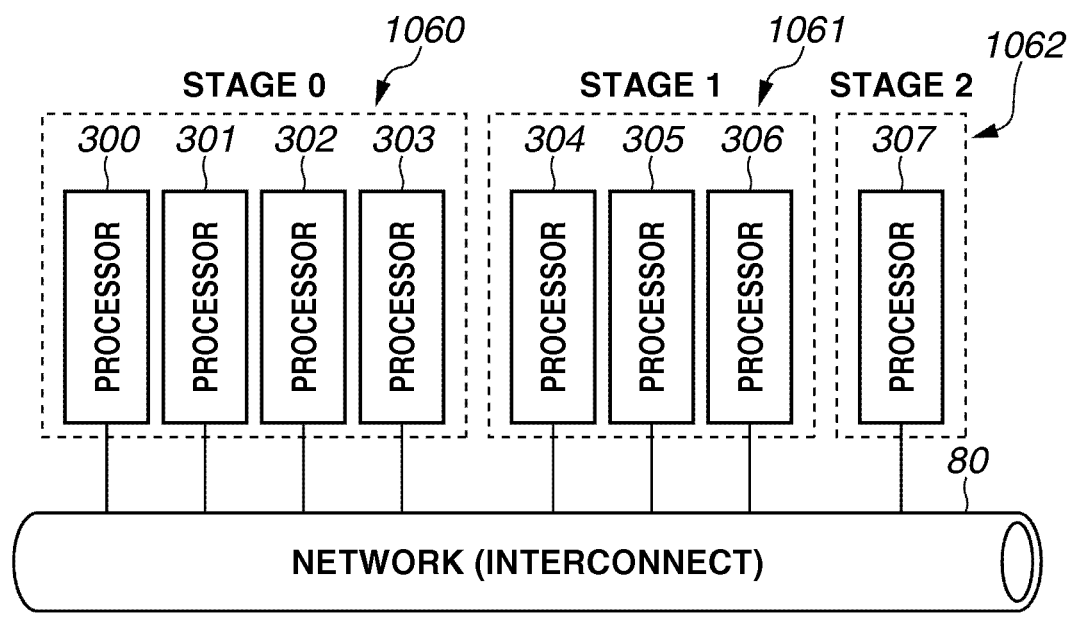
FIG. 12 illustrates an example of an identification device including a processor.

The identification device can include a processor. FIG. 12 illustrates an example of the identification device including a processor according to the present exemplary embodiment.

By implementing the identification devices 200 through 207 with processors 300 through 307, the method for changing the identification target from the example 2 (FIG. 11A) to the example 3 (FIG. 11B) can be implemented only by changing the program that the processor executes. More specifically, the present exemplary embodiment can change the module configuration by changing the program that the processor 306 illustrated in FIG. 12 from the processing program for the stage 1 to the processing program for the stage 2.

In identification processing, generally, several tens of stages are set as the cascaded stages. Accordingly, it may be difficult to provide one or more identification devices to each stage due to the restriction of the circuit configuration size. In this case, it is useful to integrate a plurality of continuous stages and provide an identification device to the integrated stages to reduce the size of the circuit configuration.

The above-described example of the present invention that uses the processors can easily implement the integral execution of processing of two or more continuous stages by using one processor by changing the program that the processor executes.

In the above-described module quantity determination method, which is used in determining the number of identification devices to be provided to each stage, it is supposed that the total number of identification devices is predetermined. In the example of the present invention that uses the processor, the integration of the processing stages to be executed by one processor when a large number of stages are set can be easily executed. Accordingly, the present exemplary embodiment can provide a larger number of alternative configurations than the number of processors. Accordingly, the present exemplary embodiment can determine a highly appropriate module configuration.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-258966, filed Oct. 3, 2008, which is hereby incorporated by reference herein in its entirety.

What is claimed is:

1. An information processing apparatus for executing information processing on each of a plurality of areas in an image, the apparatus comprising:
a plurality of execution units, wherein:
the information processing includes a plurality of stages, each of the plurality of execution units is assigned to any one of the plurality of stages and execution units assigned to an identical stage execute a processing corresponding to the assigned stage on different areas in the image in parallel;
the plurality of stages including at least a first stage and a second stage, the second stage depending upon the output of the first stage; and
each execution unit processes an area to detect either:
a positive indication that a processing corresponding to a succeeding stage is necessary for the area, which is considered successful detection, or
a negative indication that the processing corresponding to the succeeding stage is not necessary for the area, which is considered unsuccessful detection;
a determination unit configured, based on a result of information processing executed by a first execution unit selected from the plurality of execution units during the first stage of the information processing, to determine whether to execute subsequent information processing by a second execution unit selected from the plurality of the execution units during the second stage of the information processing;
a successful detection rate storage unit configured to store successful detection rates for the plurality of stages, where a successful detection rate for each stage of the plurality of stages represents a probability of executing the subsequent processing in a succeeding stage of the plurality of stages determined by the determination unit based on the result of each stage of the plurality of stages;
a processing time storage unit configured to store a processing time for each execution unit in the plurality of stages; and
a calculation unit configured to calculate a number of execution units to be assigned to respective stages of the plurality of stages so as to decrease a difference between processing times for completing respective stages on all the areas for which processing corresponding to respective stages are indicated to be necessary based on cumulative successful detection rates for respective stages and the processing times for each execution unit in the respective stages, where a cumulative successful detection rate for each stage is calculated from the successful detection rate for each of a plurality of stages preceding to that stage.

2. The information processing apparatus according to claim 1,
wherein the calculation unit is configured, in calculating the number of the execution units, to calculate a product of the successful detection rates in all stages executed previous to each stage as a cumulative successful detection rate P for that stage, and configured to calculate a value of the quantity Num for each stage so that resulting values of an expression "T×P/Num" are similar in each of the information processing stages, where "T" is the processing time taken by each execution unit at each stage and "Num" is a number of execution units at each stage.

3. The information processing apparatus according to claim 2,
wherein the calculation unit is configured, if a total number of all of the execution units is predetermined, to calculate available combinations of the number of the execution units assigned at each stage, wherein the calculation unit is further configured to calculate sequences including resulting values of the expression "T×P/Num", each of the values corresponding to each combination, in descending order, wherein the calculation unit is yet further configured to compare values of terms in each sequence from a first term thereof, to select a sequence having a term whose value is the smallest of values of the terms of the sequence, and to continue executing the selection until the number of the selected sequences reaches one, wherein the calculation unit is yet further configured, if one sequence is selected before last terms of sequences are compared, to set the number of the execution units corresponding to the selected sequence in each information processing stage as a result of the calculation, and wherein the calculation unit is yet further configured, if a plurality of sequences are remained even after executing comparison of the last terms of the sequences, to set the number of the execution units, in each information processing, corresponding to either one of the plurality of remained sequences as the calculation result.

4. The information processing apparatus according to claim 1, wherein each of the plurality of execution units is configured by a processor.

5. The information processing apparatus according to claim 4, wherein one or more execution units are configured by one processor.

6. The information processing apparatus according to claim 1, wherein if the information processing executed by the plurality of execution units is changed, the calculation unit is configured to newly calculate a number of the execution units at respective stages.

7. The information processing apparatus according to claim 1, wherein the execution unit is configured to execute identification processing as the information processing.

8. The information processing apparatus according to claim 6,
wherein the execution unit is configured to execute identification processing as the information processing, and
wherein the changing of the content of the information processing is changing of a target of the identification processing.

9. An information processing method for executing information processing on each of a plurality of areas in an image, performed by a plurality of execution units, said method comprising:
the information processing is executed in a plurality of stages, each of the plurality of execution units is assigned to any one of the plurality of stages and execution units assigned to an identical stage execute a processing corresponding to the assigned stage on different areas in the image in parallel,
the plurality of stages including at least a first stage and a second stage, the second stage depending upon the output of the first stage; and
processing by each execution unit area to detect either:
a positive indication that a processing corresponding to a succeeding stage is necessary for the area, which is considered successful detection, or a negative indication that the processing corresponding to the succeeding stage is not necessary for the area, which is considered unsuccessful detection;
determining, according to a result of information processing executed by one of the plurality of execution units, whether to execute subsequent information processing by another one of the plurality of the execution units; and
calculating a number of execution units to be assigned to respective stages of the plurality of stages so as to decrease a difference between processing times for completing respective stages on all the areas for which processing corresponding to respective stages are indicated to be necessary based on cumulative successful detection rates for respective stages and processing times for each execution unit in the respective stages read from a successful detection rate storage unit configured to store a probability of executing subsequent processing in a succeeding stage as a successful detection rate for each of the plurality of stages and from a processing time storage unit configured to store a processing time for each execution in the plurality of stages, where a cumulative successful detection rate for each stage is calculated from the successful detection rate for each of a plurality of stages preceding to that stage.

10. A non-transitory computer-readable storage medium storing instructions which, when executed by a computer, cause the computer to perform the information processing method according to claim 9.

11. The information processing apparatus according to claim 1, wherein the information processing is face detection.

12. The information processing apparatus according to claim 1, wherein the information processing detects an identification target.

13. The information processing apparatus according to claim 1, wherein the identification target is selected from a list including: a face, a human figure, and a car.

* * * * *